United States Patent
Nakano

(10) Patent No.: US 10,012,168 B2
(45) Date of Patent: Jul. 3, 2018

(54) CONTROL SYSTEM

(71) Applicant: TOYOTA JIDOSHA KABUSHIKI KAISHA, Toyota-shi, Aichi-ken (JP)

(72) Inventor: Tomohiro Nakano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 15/176,702

(22) Filed: Jun. 8, 2016

(65) Prior Publication Data

US 2016/0363078 A1     Dec. 15, 2016

(30) Foreign Application Priority Data

Jun. 11, 2015   (JP) ................. 2015-118672
Apr. 15, 2016   (JP) ................. 2016-082165

(51) Int. Cl.
  *F02D 41/22*   (2006.01)
  *F02D 41/40*   (2006.01)
  *F02D 41/30*   (2006.01)
  *F02D 41/14*   (2006.01)
  *F02D 41/38*   (2006.01)
  (Continued)

(52) U.S. Cl.
  CPC ....... *F02D 41/222* (2013.01); *F02D 41/1454* (2013.01); *F02D 41/3094* (2013.01); *F02D 41/3845* (2013.01); *F02D 41/40* (2013.01); *F02D 41/0255* (2013.01); *F02D 41/08* (2013.01); *F02D 41/20* (2013.01); *F02D 41/402* (2013.01); *F02D 2041/223* (2013.01); *F02D 2041/227* (2013.01); *F02D 2200/0602* (2013.01); *Y02T 10/44* (2013.01)

(58) Field of Classification Search
  CPC .......... F02D 41/08; F02D 41/20; F02D 41/40; F02D 41/222; F02D 41/223; F02D 41/227; F02D 41/0255; F02D 41/1454; F02D 41/3845; F02D 41/3094; F02D 2200/0602; Y02T 10/44
  See application file for complete search history.

(56) References Cited

U.S. PATENT DOCUMENTS 5,992,373 A * 11/1999 Hosoya ................. F02D 41/222
                                                                      123/179.17
7,156,078 B1 *  1/2007 Furuta .................... F02D 41/20
                                                                          123/445

(Continued)

FOREIGN PATENT DOCUMENTS

JP      2007-297933 A    11/2007
JP      2011-111905 A     6/2011
(Continued)

*Primary Examiner* — Hieu T Vo
*Assistant Examiner* — Arnold Castro
(74) *Attorney, Agent, or Firm* — Oliff PLC

(57) ABSTRACT

An abnormality flag is set when a first abnormality determination condition is established in an abnormality diagnosis of a fuel pressure sensor and it is determined that an abnormality occurs. In a case where the abnormality flag is kept cleared, when a fuel pressure detection value of the fuel pressure sensor is kept fixed for a prescribed time T2 or more and a second abnormality determination condition is established, a partial lift injection is prohibited, such that an injection control of a fuel injection valve is performed so as to perform a fuel injection without performing the partial lift injection.

10 Claims, 8 Drawing Sheets

(51) Int. Cl.
F02D 41/02 (2006.01)
F02D 41/08 (2006.01)
F02D 41/20 (2006.01)

(56) References Cited

U.S. PATENT DOCUMENTS

| | | | |
|---|---|---|---|
| 8,881,707 B2* | 11/2014 | Katsurahara | F02D 41/221 |
| | | | 123/198 D |
| 8,886,441 B2* | 11/2014 | Dolker | F02D 41/1401 |
| | | | 701/103 |
| 9,599,086 B2* | 3/2017 | Smith | F02D 41/22 |
| 9,822,722 B2* | 11/2017 | Tsutsuji | F02D 41/22 |
| 2005/0263146 A1* | 12/2005 | Oono | F02D 41/222 |
| | | | 123/690 |
| 2007/0251502 A1 | 11/2007 | Takayanagi et al. | |
| 2012/0209544 A1* | 8/2012 | Takashima | F02D 41/221 |
| | | | 702/50 |
| 2014/0311459 A1 | 10/2014 | Katsurahara | |
| 2016/0040617 A1* | 2/2016 | Nagakura | F02M 59/20 |
| | | | 701/104 |
| 2016/0076475 A1* | 3/2016 | Suzuki | F02M 63/0225 |
| | | | 123/445 |
| 2016/0348604 A1* | 12/2016 | Higuchi | F02D 41/024 |

FOREIGN PATENT DOCUMENTS

| | | |
|---|---|---|
| JP | 2013-108422 A | 6/2013 |
| JP | 2014-015894 A | 1/2014 |

* cited by examiner

CONTROL SYSTEM

INCORPORATION BY REFERENCE

The disclosure of Japanese Patent Application No. 2015-118672 and 2016-082165 filed on Jun. 11, 2015 and Apr. 15, 2016 including the specification, drawings and abstract is incorporated herein by reference in its entirety.

BACKGROUND OF THE INVENTION

1. Field of the Invention

The present invention relates to a control system.

2. Description of Related Art

An electromagnetic fuel injection valve provided in an engine to be provided in a vehicle or the like is configured such that a valve body is opened by current application to a built-in electromagnetic solenoid so as to inject a fuel. Further, in an engine of a cylinder injection type or the like, a fuel pumped up by a feed pump from a fuel tank is pressurized by a high-pressure fuel pump so as to be supplied to a fuel injection valve. In such an engine, an injection amount of the fuel injection valve per current application time changes depending on a pressure (a fuel pressure) of the fuel to be supplied to the fuel injection valve from the high-pressure fuel pump. Accordingly, as seen in Japanese Patent Application Publication No. 2014-015894 (JP 2014-015894 A), a fuel pressure sensor that detects a fuel pressure is provided, such that a current application time of the fuel injection valve is set according to the fuel pressure detected by the fuel pressure sensor.

In the meantime, in recent years, there has been known a partial-lift injection technique as a technique that achieves highly-precise very-small-amount injection by the electromagnetic fuel injection valve as described above. The partial-lift injection technique is a technique in which injection is stopped before a valve body is opened to a fully open position so as to avoid a decrease in injection-amount accuracy due to a bounce motion of the valve body. The bounce motion of the valve body is caused by a collision at a time when the valve body reaches the fully open position. Such a partial-lift injection technique is used for improvement of combustion and an exhaust property of the engine.

SUMMARY OF THE INVENTION

In the meantime, in a case where the current application time of the fuel injection valve is set based on a detection value of the fuel pressure sensor, if an abnormality occurs in the fuel pressure sensor and the detection value of the fuel pressure sensor deviates from an actual value, an injection amount of the fuel injection valve also deviates from a requested amount. As a result, a combustion state of the engine deteriorates, which may cause a misfire or an engine stall. On this account, an abnormality diagnosis is performed on the fuel pressure sensor. If its abnormality is confirmed, a pressurizing operation of the high-pressure fuel pump may be stopped as a failsafe process, such that the fuel pumped up by the feed pump is supplied to the fuel injection valve without pressurizing the fuel.

However, an accurate abnormality diagnosis of the fuel pressure sensor takes some time. In the meantime, a pressure of the fuel supplied to the fuel injection valve becomes a resistance to the lift of the valve body. On this account, a lift speed of the valve body and a time until the valve body reaches the fully open position change depending on the fuel pressure. Accordingly, in a partial lift injection in which injection is finished within a lift period of the valve body, the fuel pressure largely affects injection amount accuracy, as compared to a full lift injection. Further, in a case where the combustion state of the engine is secured by the partial lift injection, when a deviation occurs in the injection amount of the partial lift injection, it is hard to maintain a good combustion state. Accordingly, in a case where an abnormality occurs in the fuel pressure sensor at a time when the partial lift injection is performed to operate the engine, the combustion state deteriorates before a diagnosis result of the abnormality is confirmed and the failsafe process is performed, which may cause a misfire or an engine stall.

The present invention has been accomplished in consideration of the above-mentioned circumstances, and an object of the invention is to provide a control system which can secure diagnosis accuracy of abnormality of a fuel pressure sensor and which can restrain deterioration of combustion of an engine during the diagnosis.

A control system to solve the problem is applied to an engine including: a fuel injection valve configured to inject a fuel by opening a valve body according to current application; a fuel pump configured to supply the fuel to the fuel injection valve; and a fuel pressure sensor configured to detect a fuel pressure, the fuel pressure being a pressure of the fuel supplied to the fuel injection valve from the fuel pump. An electronic control unit of the control system sets a current application time of the fuel injection valve based on a requested injection amount set according to an engine operation state and a detection value of the fuel pressure sensor. The electronic control unit performs an injection control on the fuel injection valve by a partial lift injection and a full lift injection, the partial lift injection being an injection control to stop the injection before the valve body is opened to a fully open position, the full lift injection being an injection control to stop the injection after the valve body is opened to the fully open position. Further, the electronic control unit determines a temporary abnormality of the fuel pressure sensor when the second abnormality determination condition is established, and determines an abnormality of the fuel pressure sensor when the first abnormality determination condition is established. Here, the first abnormality determination condition is set as a condition to be established when an abnormality occurs in the fuel pressure sensor. Further, the second abnormality determination condition is set as a condition to be established when the fuel pressure sensor possibly has an abnormality and to be established prior to the first abnormality determination condition when an abnormality occurs in the fuel pressure sensor.

When an abnormality occurs in the fuel pressure sensor and a right fuel pressure cannot be found, a current application time of the fuel injection valve cannot be set appropriately. In view of this, in such a case, a failsafe process to allow an operation of the engine to continue even if the detection value of the fuel pressure sensor cannot be acquired normally, a process to notify a driver of the occurrence of the abnormality, and the like process are performed.

However, it is necessary to take some time to diagnose the abnormality of the fuel pressure sensor with accuracy. That is, in a case where the first abnormality determination condition is set such that diagnosis accuracy becomes high, when an abnormality occurs in the fuel pressure sensor, it also takes some time to establish the first abnormality determination condition.

In the meantime, when an injection amount of the partial lift injection deviates due to a deviation between the detection value of the fuel pressure sensor and an actual value, a combustion state is largely affected. Accordingly, when an abnormality occurs in the fuel pressure sensor during execution of the partial lift injection, a combustion state deteriorates before its diagnosis is confirmed, which may cause a misfire or an engine stall.

Here, in the electronic control unit, the second abnormality determination condition that determines the temporary abnormality of the fuel pressure sensor is a condition to be established when the fuel pressure sensor possibly has an abnormality and to be established prior to the first abnormality determination condition when an abnormality occurs in the fuel pressure sensor. On that account, when an abnormality actually occurs in the fuel pressure sensor, a temporary abnormality determination is made before the first abnormality determination condition is established and an abnormality determination of the fuel pressure sensor is confirmed.

When the temporary abnormality is determined, the electronic control unit performs an injection control on the fuel injection valve so as to perform a fuel injection without performing the partial lift injection. That is, even in a case where it is difficult to confirm that an abnormality occurs in the fuel pressure sensor, when its occurrence is suspected, the electronic control unit prohibits the partial lift injection. Accordingly, even when it takes time to make an abnormality determination of the fuel pressure sensor, deterioration in the combustion state is restrained. This accordingly makes it possible to secure the abnormality diagnosis accuracy of the fuel pressure sensor and to restrain the deterioration in combustion of the engine during the diagnosis.

Note that, in the engine including, as the fuel pump, a high-pressure fuel pump that pressurizes a fuel pumped up by a feed pump from a fuel tank and supplies the fuel to the fuel injection valve, the electronic control unit controls an operation of the high-pressure fuel pump based on the detection value of the fuel pressure sensor such that the detection value of the fuel pressure sensor achieves a target fuel pressure set according to the engine operation state. In such a control system, it is possible to perform the failsafe process at the time of the occurrence of the abnormality in the fuel pressure sensor in the following manner, for example. That is, the electronic control unit stops a pressurizing operation of the high-pressure fuel pump when the electronic control unit determines the abnormality of the fuel pressure sensor. Further, when the electronic control unit determines the abnormality of the fuel pressure sensor, the electronic control unit sets the current application time of the fuel injection valve by use of a setting value of a feed pressure of the feed pump instead of the detection value of the fuel pressure sensor. When the pressurizing operation of the high-pressure fuel pump is stopped, the fuel pumped up by the feed pump is just supplied to the fuel injection valve. The feed pressure during the operation of the engine is generally kept fixed. Here, the feed pressure is a pressure of the fuel pumped up by the feed pump. Accordingly, the electronic control unit at this time sets the current application time of the fuel injection valve by use of the setting value of the feed pressure of the feed pump instead of the detection value of the fuel pressure sensor, thereby making it possible to cause the fuel injection valve to perform a fuel injection corresponding to the requested injection amount.

In the meantime, in order to maintain the fuel pressure at the target fuel pressure, it is necessary for the electronic control unit to control the operation of the high-pressure fuel pump such that a fuel supply amount from the high-pressure fuel pump to the fuel injection valve is balanced with a fuel consumption amount of the fuel injection valve by the injection. In the meantime, in a case where an abnormality occurs in the fuel pressure sensor and the detection value of the fuel pressure sensor deviates from an actual value, even if the operation of the high-pressure fuel pump is controlled based on the detection value, the fuel supply amount of the fuel injection valve is not balanced with the fuel consumption amount. On that account, the fuel pressure detection value does not converge to the target fuel pressure. In view of this, the electronic control unit is configured such that the first abnormality determination condition is set so as to be established when a deviation between the detection value of the fuel pressure sensor and the target fuel pressure is the prescribed value or more for the prescribed abnormality determination time or more. This makes it possible to make an abnormality diagnosis on the fuel pressure sensor. Note that, in order to make an abnormality determination of the fuel pressure sensor at this time with high accuracy, it is necessary to set a long time to some extent as the abnormality determination time.

In the meantime, one of the abnormality of the fuel pressure sensor is a stack abnormality in which a sensor output, eventually the detection value of the fuel pressure sensor becomes fixed. Accordingly, the electronic control unit may set the second abnormality determination condition so as to be established when the detection value of the fuel pressure sensor is kept fixed for a prescribed time or more. Incidentally, in this case, it is not necessary to confirm a stack abnormality, but it should be determined whether or not the fuel pressure sensor is in a state where a stack abnormality is suspected to occur. Accordingly, the prescribed time may be relatively short. If the detection value of the fuel pressure sensor is kept fixed over the prescribed time and such a state further continues, the stack abnormality of the fuel pressure sensor becomes confirmative before long. On this account, if the electronic control unit sets, as a stack abnormality determination time, a time longer than the prescribed time that establishes the second abnormality determination condition, and sets the first abnormality determination condition so as to be established when the detection value of the fuel pressure sensor is kept fixed for the stack abnormality determination time, it is possible to make a diagnosis of the stack abnormality of the fuel pressure sensor.

Further, when the engine is operated in a state where an abnormality occurs in the fuel pressure sensor and its detection value deviates from an actual value, an engine stall may occur. In view of this, the electronic control unit may be configured such that the second abnormality determination condition is set so as to be established when an engine stall occurs. Note that, when the combustion largely deteriorates due to the abnormality of the fuel pressure sensor, it is conceivable that the operation of the engine cannot be continued during a time necessary for the abnormality diagnosis. In such a case, even if the engine is restarted, an engine stall occurs again before the completion of the abnormality diagnosis. Therefore, even if a restart of the engine is repeated many times, the result of the abnormality diagnosis might not be confirmed. In that respect, if the partial lift injection is prohibited at a time when an engine stall occurs, the deterioration in combustion after the engine restart is restrained. On that account, even in a case where the combustion of the engine deteriorates until an engine stall occurs due to the abnormality of the fuel pressure sensor, the abnormality of the fuel pressure sensor is easily diagnosed.

Further, in the control system in which the requested injection amount is corrected based on a detection value of an air/fuel-ratio sensor configured to detect an air/fuel ratio of a fuel/air mixture burned in the engine, such that the detection value of the air/fuel-ratio sensor achieves a target air/fuel ratio, when an injection amount of the fuel injection valve deviates from the requested injection amount due to an abnormality of the fuel pressure sensor, the air/fuel ratio cannot converge to the target air/fuel ratio, such that an absolute value of a correction amount of the requested injection amount may become large. Accordingly, in the control system, the electronic control unit may set the second abnormality determination condition so as to be established when the absolute value of the correction amount of the requested injection amount is a prescribed value or more.

When the first abnormality determination condition is not established, but when the second abnormality determination condition is established, it is desirable for the electronic control unit to prohibit a multistage injection in which a fuel corresponding to the requested injection amount is divided to be injected several times. A deviation of the fuel injection amount due to the deviation between the detection value of the fuel pressure sensor and the actual fuel pressure is larger in a case where the fuel corresponding to the requested injection amount is divided to be injected several times, as compared to a case where the fuel corresponding to the requested injection amount is injected by one fuel injection. Accordingly, in a state where an abnormality is suspected to occur in the fuel pressure sensor, the multistage injection is prohibited, so as to decrease the deviation of the fuel injection amount at a time when the detection value of the fuel pressure sensor cannot be acquired normally. This eventually makes it possible to restrain the deterioration in combustion of the engine due to the deviation.

Note that, during warming up of a catalyst device that purifies exhaust gas and during an idling operation of the engine, the electronic control unit performs a multistage injection control by a fuel injection during an intake stroke by the full lift injection and a fuel injection during a compression stroke by the partial lift injection. Then, by collecting the fuel injected by the partial lift injection around an ignition plug, it is possible to stabilize the combustion at a cold start in which the fuel is hard to vaporize. A deviation of the injection amount of the partial lift injection during the compression stroke at this time directly leads to the deterioration in combustion. On that account, the control system yields a prominent effect in a case where such a multistage injection is performed.

In the meantime, the engine of the control system includes, as the fuel pump, a high-pressure fuel pump configured to pressurize a fuel pumped up by the feed pump from the fuel tank, and also includes, as the fuel injection valve, a cylinder injection valve configured to inject, into a cylinder, the fuel supplied from the high-pressure fuel pump. Further, the engine of the control system includes a port injection valve configured to inject, into an intake port, the fuel supplied from the feed pump without passing through the high-pressure fuel pump. In the engine, in a case where the partial lift injection of the cylinder injection valve is prohibited, the fuel injection can be performed by a fuel injection by the full lift injection of the cylinder injection valve and a fuel injection by the port injection valve. In the meantime, when an abnormality occurs in the fuel pressure sensor, it is difficult to control the fuel pressure in the high-pressure fuel pipe appropriately, and further, it is difficult to check the fuel pressure. On this account, when an abnormality occurs in the fuel pressure sensor, the fuel pressure in the high-pressure fuel pipe may largely decrease with respect to the requested fuel pressure. When the fuel pressure in the high-pressure fuel pipe decreases, the injection pressure of the fuel injection by the cylinder injection valve also decreases. In a case of a high load operation in which an internal pressure of the cylinder at the time of the injection becomes high, the injection pressure becomes insufficient, which may make it difficult to perform the fuel injection by the cylinder injection valve. Even in such a case, the electronic control unit is configured such that, in a case where the partial lift injection is prohibited, when the engine load factor is a prescribed value or more, the electronic control unit performs a fuel injection control by a full lift injection of the port injection valve, but when the engine load factor is less than the prescribed value, the electronic control unit performs a fuel injection control by the full lift injection of the cylinder injection valve. By performing these injection controls, even if the fuel pressure in the high-pressure fuel pipe becomes low, it is possible to avoid such a situation that the fuel injection becomes impossible due to an insufficient injection pressure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
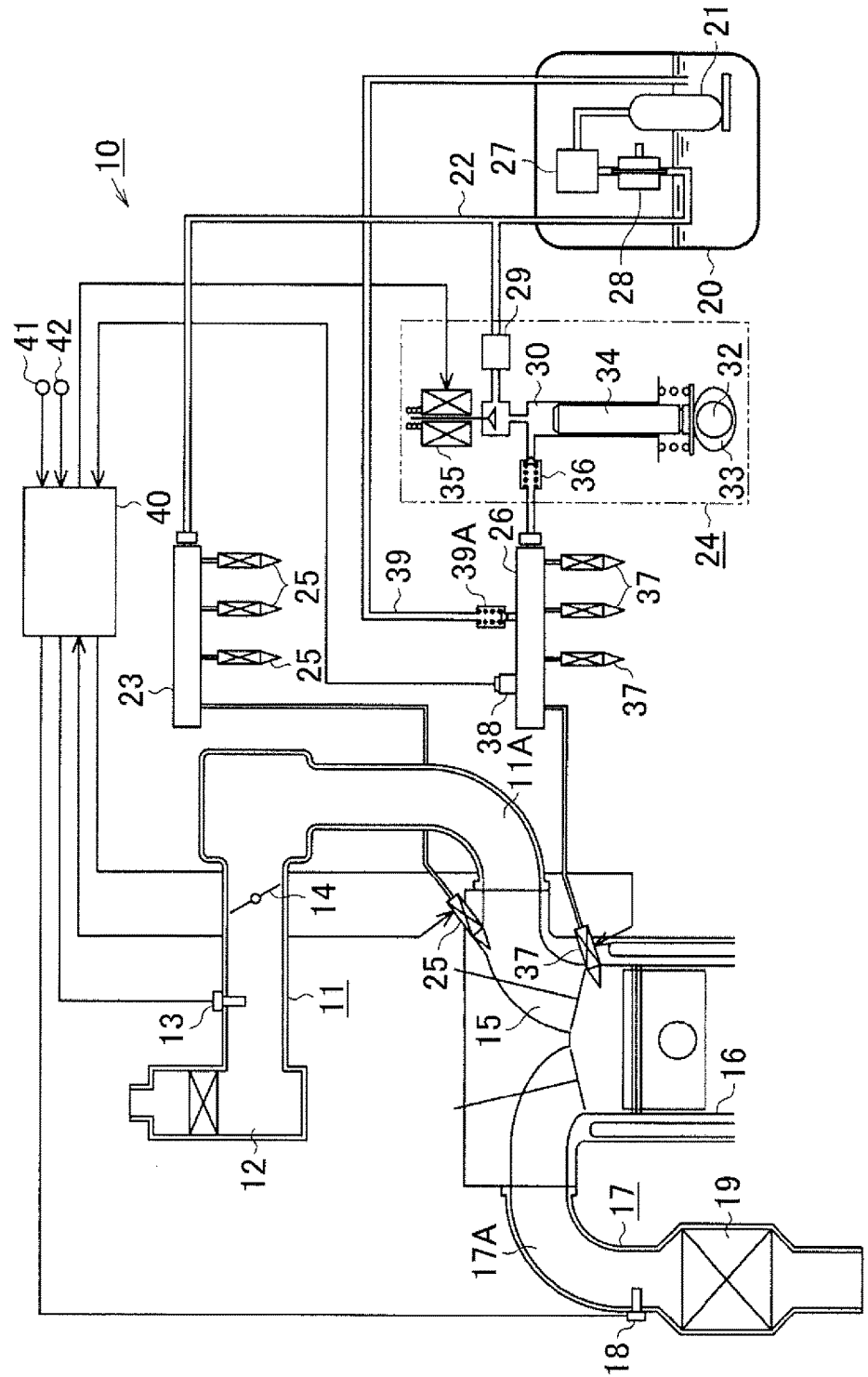
FIG. 1 is a schematic drawing schematically illustrating a configuration of an engine to which a first embodiment of a control system is applied.

The following describes details of a first embodiment of a control system with reference to FIG. 1 to FIG. 6. As illustrated in FIG. 1, an intake passage 11 of an engine 10 to which the control system of the present embodiment is applied is provided with an air cleaner 12, an air flow meter 13, a throttle valve 14, and an induction manifold 11A in order from an upstream side. The air cleaner 12 filters out dust form intake air flowing into the intake passage 11. The air flow meter 13 detects a flow rate (an intake-air amount GA) of the intake air. The throttle valve 14 adjusts the intake-air amount by changing a valve opening degree thereof. The intake passage 11 is branched off at the induction manifold 11A, and then connected to each cylinder 16 through an intake port 15 provided for each cylinder.

In the meantime, an exhaust passage 17 of the engine 10 is provided with an exhaust manifold 17A, an air/fuel-ratio sensor 18, and a catalyst device 19 in order from the upstream side. Exhaust gases exhausted from respective cylinders 16 to the exhaust passage 17 flow together at the exhaust manifold 17A and then flow into the catalyst device 19, so that the exhaust gases are purified in the catalyst device 19. The air/fuel-ratio sensor 18 outputs a signal corresponding to an air/fuel ratio at the time of combustion of the exhaust gases flowing into the catalyst device 19.

Such a control system of the engine 10 includes a feed pump 21 that pumps out a fuel in a fuel tank 20 and discharges the fuel. The feed pump 21 is connected to a low-pressure fuel pipe 23 and a high-pressure fuel pump 24 through a low-pressure fuel passage 22. The low-pressure fuel pipe 23 is a fuel container in which to store the fuel sent from the feed pump 21, and the port injection valves 25 of respective cylinders 16 of the engine 10 are connected thereto. The port injection valve 25 is configured as an electromagnetic fuel injection valve that injects the fuel stored in the low-pressure fuel pipe 23 into its corresponding intake port 15 of the engine 10 according to current application. In the meantime, the high-pressure fuel pump 24 further pressurizes the fuel sent from the feed pump 21 so as to discharge the fuel to a high-pressure fuel pipe 26. Note that the low-pressure fuel passage 22 is provided with a filter 27 that filters the fuel discharged by the feed pump 21, and a pressure regulator 28 that is opened at a time when a fuel pressure (a feed pressure) in the low-pressure fuel passage 22 exceeds a prescribed relief pressure, so as to release the fuel inside the low-pressure fuel passage 22 into the fuel tank 20.

Two volume portions, i.e., a fuel gallery 29 and a pressurizing chamber 30, are provided inside the high-pressure fuel pump 24. The fuel sent from the feed pump 21 through the low-pressure fuel passage 22 is introduced into the fuel gallery 29. Note that, inside the fuel gallery 29, a pulsation damper for attenuating pulsation of the fuel pressure is provided. Further, the high-pressure fuel pump 24 is provided with a plunger 34 that reciprocates by a pump-driving cam 33 provided in a camshaft 32 of the engine 10 so as to change a volume of the pressurizing chamber 30.

The fuel gallery 29 is connected to the pressurizing chamber 30 via an electromagnetic spill valve 35. The electromagnetic spill valve 35 is a normally-open valve that is closed according to current application. At the time of opening, the electromagnetic spill valve 35 communicates the fuel gallery 29 with the pressurizing chamber 30, and at the time of closing, the electromagnetic spill valve 35 blocks the communication therebetween. Further, the pressurizing chamber 30 communicates with the high-pressure fuel pipe 26 via a check valve 36. When the pressurizing chamber 30 reaches a pressure higher than the high-pressure fuel pipe 26, the check valve 36 is opened to allow fuel discharge from the pressurizing chamber 30 to the high-pressure fuel pipe 26. In the meantime, when the high-pressure fuel pipe 26 reaches a pressure higher than the pressurizing chamber 30, the check valve 36 is closed to restrict reverse flow of the fuel from the high-pressure fuel pipe 26 to the pressurizing chamber 30.

The high-pressure fuel pipe 26 is a fuel container in which to store a high-pressure fuel sent from the high-pressure fuel pump 24, and cylinder injection valves 37 provided in respective cylinders 16 of the engine 10 are connected thereto. The cylinder injection valve 37 is configured as an electromagnetic fuel injection valve that injects the fuel stored in the high-pressure fuel pipe 26 into its corresponding cylinder 16 according to current application. Note that a fuel pressure sensor 38 that detects a fuel pressure (a high-pressure-side fuel pressure) inside the high-pressure fuel pipe 26 is attached thereto. Further, a relief valve 39A is attached to the high-pressure fuel pipe 26. The relief valve 39A is opened at a time when the pressure inside the high-pressure fuel pipe 26 increases excessively, so as to release the fuel thereinside into the fuel tank 20 through a relief passage 39.

Further, the control system of the engine includes an electronic control unit 40. The electronic control unit 40 includes: a central processing unit that performs various arithmetic processes; a read only memory in which programs and data for the arithmetic processes are stored in advance; and a random access memory that temporarily stores an operation result of the central processing unit, detection results of various sensors, and so on. Further, the electronic control unit 40 includes a nonvolatile memory that retains data in case of power off.

Detection signals from various sensors such as a crank angle sensor 41 and an accelerator pedal sensor 42 in addition to the air flow meter 13, the air/fuel-ratio sensor 18, and the fuel pressure sensor 38 are input into the electronic control unit 40. The crank angle sensor 41 detects a rotational phase (a crank angle) of a crankshaft of the engine 10. The accelerator pedal sensor 42 detects a stepping amount of an accelerator pedal by a driver. The electronic control unit 40 controls the turning on and off of the electromagnetic spill valve 35 of the high-pressure fuel pump 24, the port injection valves 25, and the cylinder injection valves 37 based on detection results of those sensors. Note that the electronic control unit 40 calculates an engine rotation number NE based on the detection result of the crank angle sensor 41, and calculates an engine load factor KL based on the detection results of the air flow meter 13 and the accelerator pedal sensor 42. Note that the engine load factor KL indicates a ratio of a current cylinder mass airflow, when a maximum value of a cylinder mass airflow at a current engine rotation number NE with normal aspiration is assumed "100%." The engine load factor KL is used as an index value of an engine load.

The electronic control unit 40 controls the fuel pressure (the high-pressure-side fuel pressure) in the high-pressure fuel pipe 26 in a variable manner by controlling the turning on and off of the electromagnetic spill valve 35 of the high-pressure fuel pump 24. Here, a pressurizing operation of the high-pressure fuel pump 24 is described first. Note that, in the following description, a movement of the plunger 34 to a direction in which a volume of the pressurizing chamber 30 is reduced is referred to as "move up," and a movement of the plunger 34 to a direction in which the volume of the pressurizing chamber 30 is increased is referred to as "move down."

The fuel sent from the feed pump 21 is introduced into the fuel gallery 29 of the high-pressure fuel pump 24 through the low-pressure fuel passage 22. Here, when the plunger 34 moves down in a state where the electromagnetic spill valve 35 is opened, the fuel is sucked into the pressurizing chamber 30 from the fuel gallery 29 as the volume of the pressurizing chamber 30 is increased. After that, when the plunger 34 shifts from moving down to moving up, the volume of the pressurizing chamber 30 is gradually reduced. If the electromagnetic spill valve 35 at this time is kept opened, the fuel is returned back to the fuel gallery 29 from the pressurizing chamber 30 according to the reduction in the volume. When current application to the electromagnetic spill valve 35 is started during the moving up of the plunger 34, the electromagnetic spill valve 35 is closed so that the pressurizing chamber 30 is sealed up. Accordingly, the fuel pressure in the pressurizing chamber 30 increases according to the reduction in the volume. When the fuel pressure in the pressurizing chamber 30 becomes higher than the fuel pressure in the high-pressure fuel pipe 26, the check valve 36 is opened, so that the fuel in the pressurizing chamber 30 in which the pressure becomes high is force-fed to the high-pressure fuel pipe 26. After that, when the current application to the electromagnetic spill valve 35 is stopped at a time when the plunger 34 shifts from moving up to moving down, the fuel is sucked again into the pressurizing chamber 30 from the fuel gallery 29. By repeating the suction of the fuel during the moving down of the plunger 34 and pressurization and discharge of the fuel during the moving up thereof, the high-pressure fuel pump 24 performs fuel supply to the high-pressure fuel pipe 26.

Note that an amount of the fuel discharged from the high-pressure fuel pump 24 (hereinafter referred to as a fuel discharge amount of the high-pressure fuel pump 24) for one moving up/down operation of the plunger 34 is increased when a start time of the current application to the electromagnetic spill valve 35 during a moving-up period of the plunger 34 is advanced. Meanwhile, the fuel discharge amount of the high-pressure fuel pump 24 is decreased when the start time of the current application to the electromagnetic spill valve 35 is delayed. By adjusting a current application start timing of the electromagnetic spill valve 35 as such, the electronic control unit 40 performs a fuel pressure variable control to variably control the fuel pressure in the high-pressure fuel pipe 26.

At the time of the fuel pressure variable control, the electronic control unit 40 initially calculates a target fuel pressure Pt based on the engine load factor KL and the like. The target fuel pressure Pt is a target value of the fuel pressure in the high-pressure fuel pipe 26. When the engine load factor KL is low, the target fuel pressure Pt is basically set to a low pressure, but when the engine load factor KL is high, the target fuel pressure Pt is set to a high pressure.

Then, the electronic control unit 40 adjusts the current application start timing of the electromagnetic spill valve 35 during the moving-up period of the plunger 34 so that a detection value of the fuel pressure sensor (hereinafter referred to as a fuel pressure detection value Pm) in the high-pressure fuel pipe 26 approaches the target fuel pressure Pt according to a deviation between the fuel pressure detection value Pm and the target fuel pressure Pt. The detection value of the fuel pressure sensor in the high-pressure fuel pipe 26 is detected by the fuel pressure sensor 38. More specifically, when the fuel pressure detection value Pm is lower than the target fuel pressure Pt, the current application start timing of the electromagnetic spill valve 35 is advanced, so as to increase a fuel discharge amount of the high-pressure fuel pump 24. Further, when the fuel pressure detection value Pm is higher than the target fuel pressure Pt, the current application start timing of the electromagnetic spill valve 35 is delayed, so as to decrease the fuel discharge amount of the high-pressure fuel pump 24. Thus, the electronic control unit 40 keeps the fuel pressure in the high-pressure fuel pipe 26 at the target fuel pressure Pt.

Further, the electronic control unit 40 controls fuel injections by the port injection valve 25 and the cylinder injection valve 37. The fuel injection control is performed in the following manner.

At the time of the fuel injection control, the electronic control unit 40 first calculates a requested injection amount Qt based on an operation state (the engine rotation number NE, the engine load factor KL, and the like) of the engine 10. The requested injection amount Qt is a total requested value of the fuel to be injected in each cylinder for one combustion cycle. Further, the electronic control unit 40 determines separate injection rates of the port injection valve 25 and the cylinder injection valve 37 based on the operation state of the engine 10. The electronic control unit 40 divides the requested injection amount Qt between a port injection amount Qp and a cylinder injection amount Qd according to the separate injection rates. The port injection amount Qp is an amount of a fuel to be injected by the port injection valve 25, and the cylinder injection amount Qd is an amount of a fuel to be injected by the cylinder injection valve 37. Further, the electronic control unit 40 calculates a necessary current application time of the port injection valve 25 for a fuel injection corresponding to the port injection amount Qp and a necessary current application time of the cylinder injection valve 37 for a fuel injection corresponding to the cylinder injection amount Qd. The electronic control unit 40 performs current application on the port injection valve 25 and the cylinder injection valve 37 for respective current application times thus calculated.

Note that, as described above, the fuel pressure in the high-pressure fuel pipe 26 that supplies the fuel to the cylinder injection valve 37 is controlled in a variable manner. When the fuel pressure changes, an amount of the fuel to be injected by the cylinder injection valve 37 per unit time is changed according to current application. Accordingly, the current application time of the cylinder injection valve 37 is calculated as follows: the fuel pressure detection value Pm of the fuel pressure sensor 38 is referred to, and when the fuel pressure in the high-pressure fuel pipe 26 is the fuel pressure detection value Pm, a current application time necessary for a fuel injection corresponding to the cylinder injection amount Qd is calculated.

In the meantime, the cylinder injection valve 37 that injects the fuel at a higher pressure injects more fuel by short-time current application, as compared with the port injection valve 25 that injects the fuel at a lower pressure. In such a cylinder injection valve 37, the following structural problem largely affects injection amount accuracy in a slight-amount fuel injection.

Figure 2:
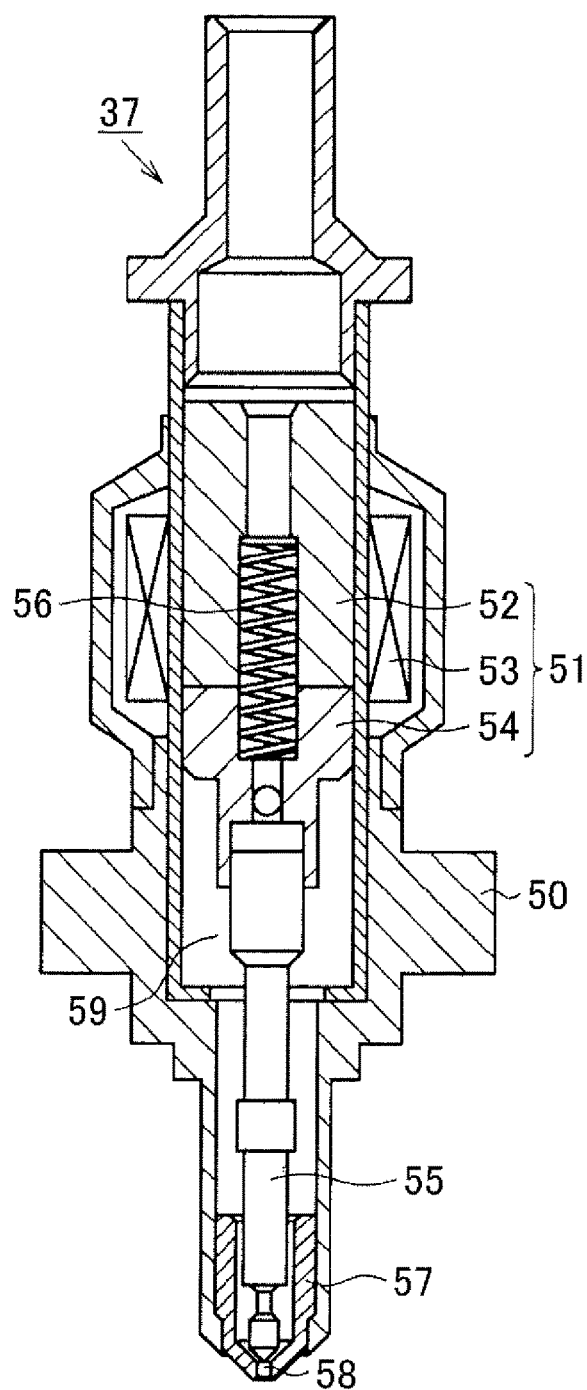
FIG. 2 is a sectional view of a cylinder injection valve provided in the engine.

FIG. 2 illustrates a sectional structure of the cylinder injection valve 37. Note that, in the following discussion, a lower side in the figure is referred to as a distal end side of the cylinder injection valve 37. As illustrated in FIG. 2, an electromagnetic solenoid 51 is provided inside a housing 50 of the cylinder injection valve 37. The electromagnetic solenoid 51 includes a fixed core 52 fixed to the housing 50, an electromagnetic coil 53 provided around the fixed core 52, and a movable core 54 provided on the distal end side so as to be adjacent to the fixed core 52. The movable core 54 is provided in the housing 50 so as to be displaceable in an up-down direction in the figure. A valve body 55 is connected to the movable core 54 so as to be displaceable together. Further, a spring 56 that biases the movable core 54 toward the distal end side is provided inside the housing 50.

In the meantime, a nozzle body 57 is attached to a distal-end-side part of the housing 50 so as to surround a distal end of the valve body 55. A slit-shaped injection hole 58 is formed in a distal end of the nozzle body 57 such that the injection hole 58 communicates the inside and outside of the nozzle body 57. Note that a combustion chamber 59 into which the fuel sent from the high-pressure fuel pipe 26 is introduced is formed inside the housing 50.

In such a cylinder injection valve 37, the valve body 55 and the movable core 54 are biased by the spring 56 toward the distal end side. In a state where current application to the electromagnetic solenoid 51 is not performed, the valve body 55 is displaced, due to a biasing force of the spring 56, to a position (hereinafter referred to as a fully closing position) at which the valve body 55 is seated on the nozzle body 57, so as to close the injection hole 58.

When current application to the electromagnetic solenoid 51 is started, an electromagnetic suction force occurs between the fixed core 52 and the movable core 54, so that the valve body 55 and the movable core 54 are displaced toward a side approaching the fixed core 52. When the distal end of the valve body 55 is separated from the nozzle body 57, the injection hole 58 is opened, so that the fuel inside the combustion chamber 59 is injected outside. Note that the valve body 55 can be displaced toward a side where the distal end of the valve body 55 is separated from the nozzle body 57 up to a position (hereinafter referred to as a fully open position) at which the movable core 54 abuts with the fixed core 52.

When current application to the electromagnetic solenoid 51 is stopped after that, the valve body 55 is displaced toward the fully closing position. Then, when valve body 55 reaches the fully closing position, the injection hole 58 is closed so that the fuel injection is stopped. Note that, in the following description, a separation amount of the distal end of the valve body 55 from the nozzle body 57 is referred to as a nozzle lift amount of the cylinder injection valve 37.

Figure 3:
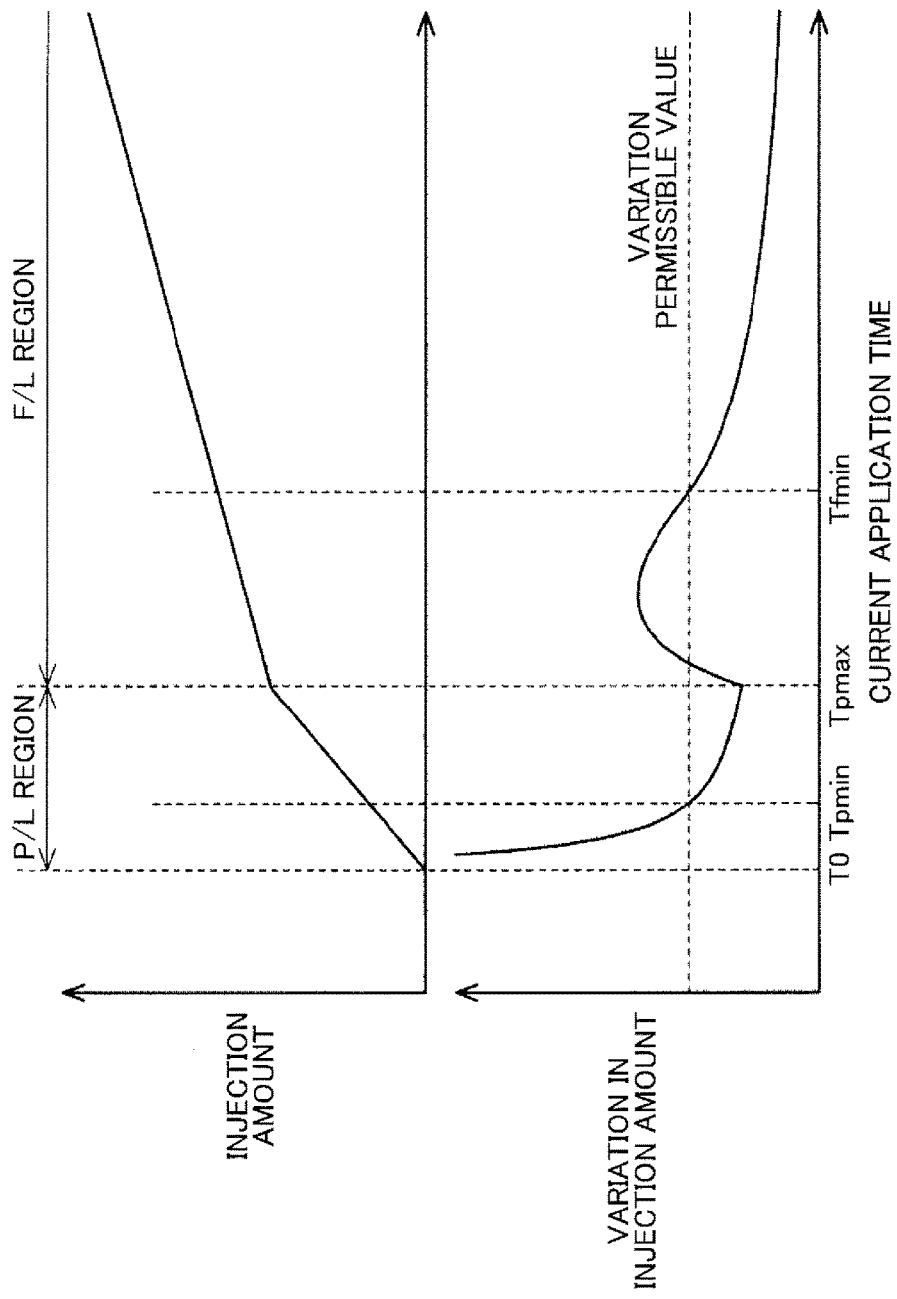
FIG. 3 is a graph illustrating a relationship of an injection amount and its variation of the cylinder injection valve with a current application time.

FIG. 3 illustrates a relationship of an injection amount and its variation of the cylinder injection valve 37 with a current application time with respect to the electromagnetic solenoid 51. In FIG. 3, "T0" indicates a current application time (a lift-starting current application time) necessary to start separation (lift) of the valve body 55 from the nozzle body 57, and "Tpmax" indicates a current application time (a P/L maximum current application time) necessary for the valve body 55 to reach the fully open position.

As illustrated in FIG. 3, in a zone from "T0 to Tpmax," the nozzle lift amount changes during current application. Accordingly, a change rate of the injection amount of the cylinder injection valve 37 with respect to the current application time becomes relatively large. In the meantime, in a zone after "Tpmax," the nozzle lift amount is maintained to an amount in fully opening. Accordingly, the change rate of the injection amount of the cylinder injection valve 37 with respect to the current application time becomes small as compared to the zone from "T0 to Tpmax." In the following description, the zone from "T0 to Tpmax" in which the valve body 55 does not reach a fully opening state is referred to as a partial lift (P/L) zone. Further, the zone after "Tpmax" in which the valve body 55 has reached the fully opening state is referred to as a full lift (F/L) zone.

A time (the lift-starting current application time T0) after current application start but before the valve body 55 is started to lift varies to some extent, and the variation causes a variation in the injection amount in the P/L zone. Note that an influence of the variation in the lift-starting current application time T0 with respect to the variation in the injection amount relatively decreases as the injection amount increases. On this account, the variation in the injection amount in the P/L zone decreases according to an increase in the current application time.

In the meantime, when the valve body 55 reaches the fully open position at which the movable core 54 abuts with the fixed core 52, the valve body 55 bounces due to a reaction to the collision between the movable core 54 and the fixed core 52. A microscopic vibration of the nozzle lift amount due to the bouncing motion increases the variation in the injection amount. Such an influence of the bouncing motion of the valve body 55 in fully opening with respect to the variation in the injection amount also relatively decreases as the injection amount increases. Because of this, the variation in the injection amount of the cylinder injection valve 37 once increases right after the F/L zone, and then decreases as the current application time increases. Accordingly, if the electronic control unit 40 performs the fuel injection control by setting the current application time to be not less than a prescribed time (an F/L minimum current application time Tfmin), which is longer than the P/L maximum current application time Tpmax, it is possible to restrain the variation in the injection amount to be not more than a permissible value.

In the meantime, as described above, even in the P/L zone, the variation in the injection amount is relatively small during a current application time just before the F/L zone. Thus, even if the electronic control unit 40 sets the current application time to be not less than a prescribed time (a P/L minimum current application time Tpmin) but less than the P/L maximum current application time Tpmax, it is possible to restrain the variation in the injection amount to be not more than the permissible value. In the present embodiment, by performing so-called partial lift injection, which is a fuel injection in which the valve body 55 does not reach the fully opening state with the current application time being set in such a range, a slight-amount fuel injection by the cylinder injection valve 37 is performed with high injection amount accuracy. Incidentally, in contrast with the partial lift injection, a fuel injection in which the valve body 55 reaches the fully opening state is referred to as full lift injection.

Incidentally, the port injection valve 25 also has a similar structural problem. However, even when the port injection amount Qp is a lower limit of its control range, a current application time of the port injection valve 25 is longer than an F/L minimum current application time Tfmin of the port injection valve 25, so all fuel injections by the port injection valve 25 are performed by a full lift injection in which a valve body reaches its fully opening position.

In the control system of the present embodiment, the electronic control unit 40 performs a catalyst warm-up promotion control to promote warming up of the catalyst device 19 at the time of cold start of the engine 10. In such a catalyst warm-up promotion control, the partial lift injection is performed.

More specifically, in the catalyst warm-up promotion control, a fuel injection during an idling operation of the engine 10 in a state where warming up of the catalyst device 19 is unfinished is performed by a multistage injection including a fuel injection during an intake stroke by the full lift injection of the cylinder injection valve 37, and a fuel injection during a compression stroke by the partial lift injection of the cylinder injection valve 37. At this time, a fuel injected during the compression stroke by the partial lift injection is carried to near an ignition plug by airflow inside the cylinder. Hereby, a fuel/air mixture is formed inside the cylinder such that a fuel concentration is locally high around the ignition plug. This achieves successful combustion even at the cold start in which a cylinder wall temperature is low and the fuel is hard to vaporize. This increases an exhaust gas temperature so as to promote a temperature increase in the catalyst device 19.

As described above, the fuel injection by the cylinder injection valve 37 is performed such that a current application time that achieves injection of a fuel corresponding to the cylinder injection amount Qd is calculated based on the fuel pressure detection value Pm detected by the fuel pressure sensor 38, and current application is performed on the electromagnetic solenoid 51 of the cylinder injection valve 37 for the current application time thus calculated. On this account, if an abnormality occurs in the fuel pressure sensor 38 and its fuel pressure detection value Pm indicates a value that deviates from an actual fuel pressure in the high-pressure fuel pipe 26, an amount of a fuel to be actually injected by the cylinder injection valve 37 deviates from a requested cylinder injection amount Qd, which may cause deterioration in combustion.

In the meantime, as described above, the fuel pressure detection value Pm of the fuel pressure sensor 38 is used for the fuel pressure variable control. That is, in the fuel pressure variable control, the pressurizing operation of the high-pressure fuel pump 24 is controlled so that the fuel pressure detection value Pm achieves the target fuel pressure Pt. When an abnormality occurs in the fuel pressure sensor 38, it is difficult for the fuel pressure detection value Pm to converge to the target fuel pressure Pt by the fuel pressure variable control. In view of this, in the present embodiment, when a deviation between the fuel pressure detection value Pm and the target fuel pressure Pt is kept at a prescribed value or more for a prescribed abnormality determination time T1 or more, it is determined that "abnormality occurs." Hereby, an abnormality diagnosis is performed on the fuel pressure sensor 38. That is, in the present embodiment, a first abnormality determination condition is set so as to be established when the deviation between the fuel pressure detection value Pm and the target fuel pressure Pt is kept at the prescribed value or more for the prescribed abnormality determination time T1 or more. When the first abnormality determination condition is established, it is determined that an abnormality occurs in the fuel pressure sensor 38.

Note that, even in a case where no abnormality occurs in the fuel pressure sensor 38, the fuel pressure detection value Pm may temporarily deviate from the target fuel pressure Pt. Accordingly, in order to secure high diagnosis accuracy without a false determination, it is necessary to set a long time to some extent as the abnormality determination time T1.

In the present embodiment, the following process is performed as a failsafe process at a time when it is determined that an abnormality occurs in the fuel pressure sensor 38. That is, a stop of the pressurizing operation of the high-pressure fuel pump 24 and a change of computing mode of the current application time of the cylinder injection valve 37 are performed as the failsafe process.

Figure 4:
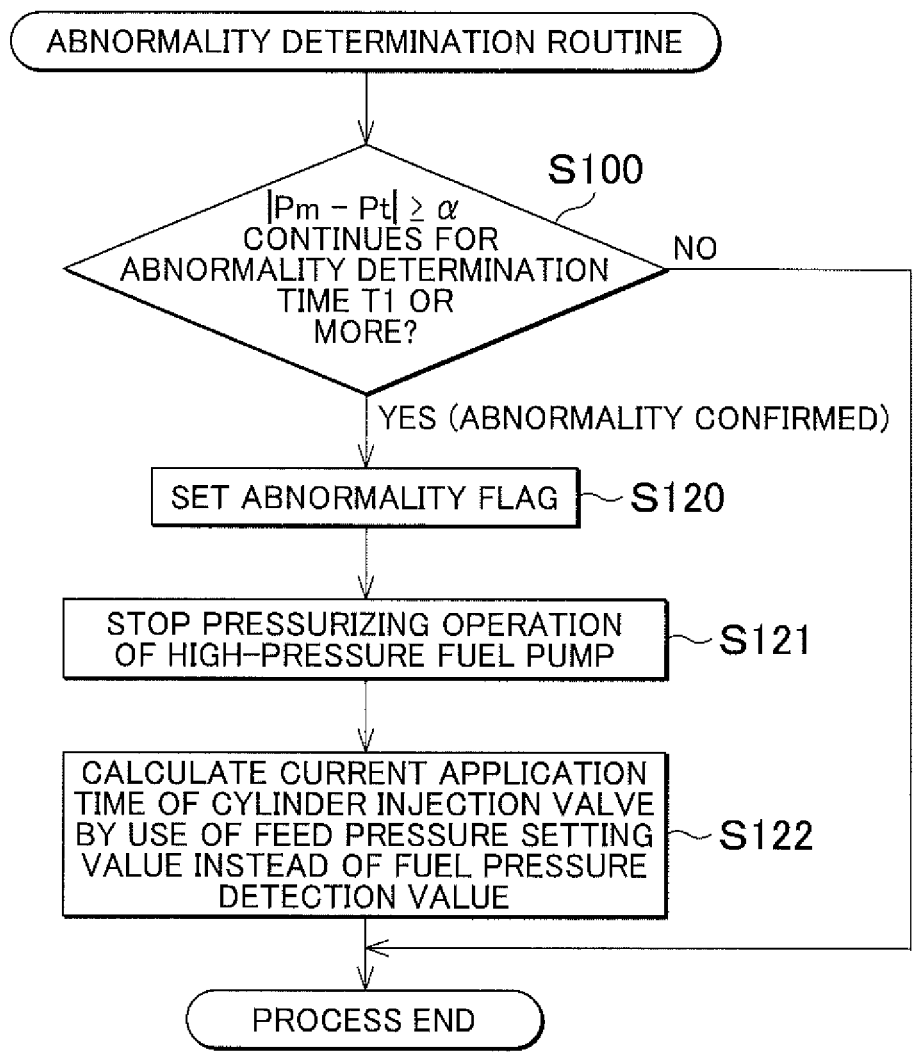
FIG. 4 is a flowchart of an abnormality determination routine performed in the control system of the first embodiment.

FIG. 4 illustrates a flowchart of an abnormality determination routine performed for the abnormality diagnosis and the failsafe process. The process of this routine is performed repeatedly by the electronic control unit 40 every prescribed control cycle during the operation of the engine 10.

When the process of this routine is started, it is first determined whether or not the first abnormality determination condition is established in step S100. That is, it is determined whether or not a state where the deviation (an absolute value) between the fuel pressure detection value Pm and the target fuel pressure Pt is a kept at a prescribed value α or more continues for the abnormality determination time T1 or more. Here, if the first abnormality determination condition is not established (NO), the process of this routine is just finished. Meanwhile, if the first abnormality determination condition is established (YES), the process proceeds to step S120.

When the process proceeds to step S120, an abnormality flag is set in step S120. The abnormality flag is a flag that is set when an occurrence of an abnormality of the fuel pressure sensor 38 is confirmed, and its value is stored in a nonvolatile memory of the electronic control unit 40. At the time of assembling the electronic control unit 40 to the engine 10, the abnormality flag is cleared. Once the abnormality flag is set, the abnormality flag is maintained to be set until inspection and repair at a repair shop is finished. At this time, an indicator to notify a driver of the occurrence of the abnormality is turned on and a history of the occurrence of the abnormality in the fuel pressure sensor 38 is recorded in the nonvolatile memory of the electronic control unit 40.

Subsequently, in step S121 and step S122, the failsafe process is performed, and after that, the process of this routine is finished. That is, after the pressurizing operation of the high-pressure fuel pump 24 is stopped in step S121, a computing mode of the current application time of the cylinder injection valve 37 is changed in step S122 so as to use a feed pressure setting value Pf instead of the fuel pressure detection value Pm. The partial lift injection is prohibited in the failsafe process, which will be described later.

In a case where the failsafe process has been already performed at a time point when the process is advanced to step S121, the execution thereof is just continued. That is, in the electronic control unit 40, the stop of the pressurizing operation of the high-pressure fuel pump 24 and the calculation of the current application time of the cylinder injection valve 37 by use of the feed pressure setting value Pf instead of the fuel pressure detection value Pm are continued.

In the meantime, in the cylinder injection valve 37, a fuel pressure in the combustion chamber 59 works as a resistance to the lift of the valve body 55, which largely affects an opening operation of the valve body 55. In the partial lift injection that finishes the injection within a lift period of the valve body 55, the fuel pressure largely affects injection amount accuracy as compared to the full lift injection. Further, in a case where a combustion state of the engine 10 is secured by the partial lift injection, when a deviation occurs in the injection amount of the partial lift injection, it is hard to maintain a good combustion state.

On the other hand, as described above, an accurate abnormality diagnosis of the fuel pressure sensor 38 takes some time. In a period after an abnormality occurs but before the diagnosis result is confirmed and the failsafe process is started, the current application time of the cylinder injection valve 37 is calculated based on an inaccurate fuel pressure detection value Pm of the fuel pressure sensor 38 in which the abnormality occurs. Accordingly, when an abnormality occurs in the fuel pressure sensor 38 during the execution of the partial lift injection, the combustion state deteriorates before the failsafe process is started, which may cause a misfire or an engine stall.

In the present embodiment, a P/L injection prohibition control (described below) is performed so as to deal with such a problem. More specifically, in the P/L injection prohibition control, a condition which is established when an abnormality possibly occurs in the fuel pressure sensor 38 and which is established prior to the first abnormality determination condition at a time when an abnormality occurs in the fuel pressure sensor 38 is set as a second abnormality determination condition. When the second abnormality determination condition is established, the partial lift injection is prohibited. That is, when the second abnormality determination condition is established, the electronic control unit 40 performs an injection control on the cylinder injection valve 37 and the port injection valve 25 so as to perform a fuel injection without performing the partial lift injection.

In the present embodiment, such a second abnormality determination condition is set to be established when the fuel pressure detection value Pm of the fuel pressure sensor 38 is kept fixed for a prescribed time T2 or more. The reason is as follows.

One of the abnormality of the fuel pressure sensor 38 is a stack abnormality in which a sensor output becomes fixed. When such a stack abnormality occurs, the fuel pressure detection value Pm is kept at a fixed value and does not change. On this account, when the fuel pressure detection value Pm of the fuel pressure sensor 38 is kept fixed, there is a possibility that the stack abnormality occurs. Note that, in the P/L injection prohibition control, it is not necessary to confirm the stack abnormality, as long as a state where the stack abnormality is suspected to occur can be detected. Accordingly, a time shorter than the abnormality determination time T1 is set as the prescribed time T2.

Figure 5:
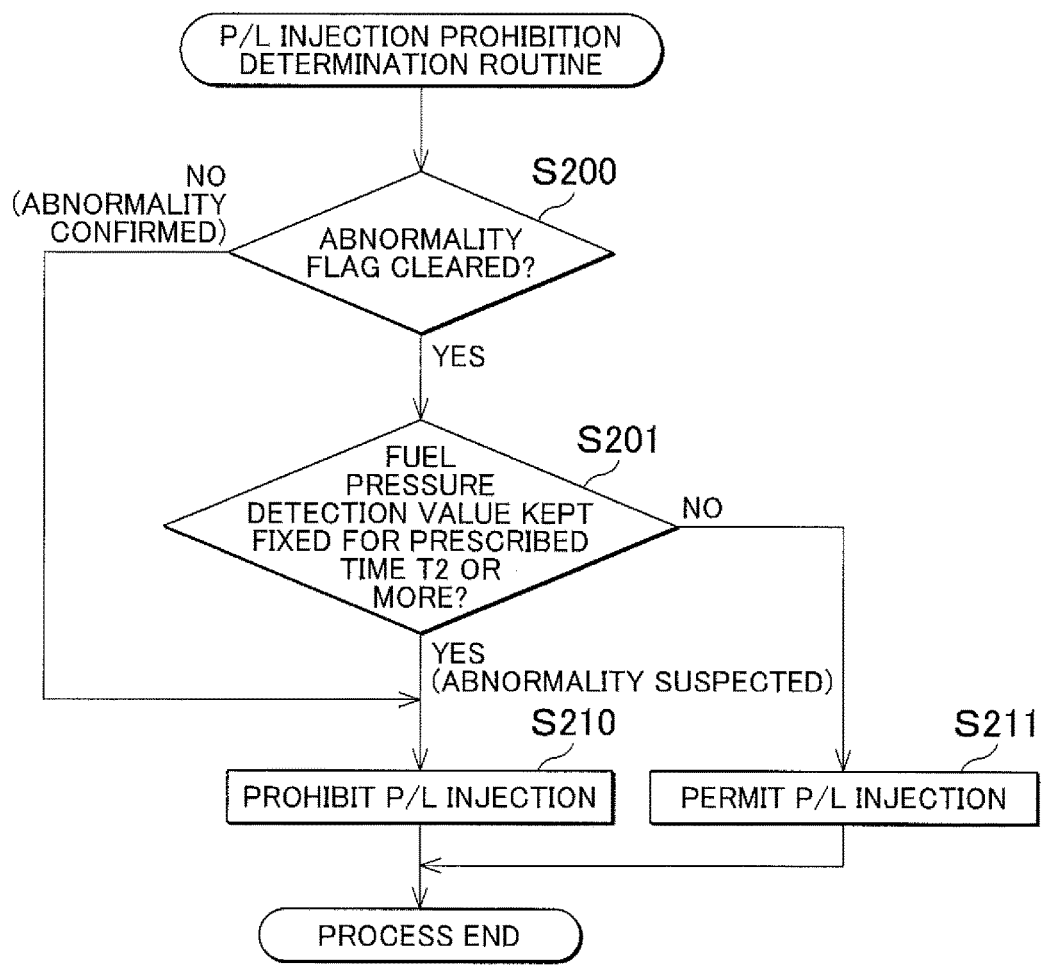
FIG. 5 is a flowchart of a P/L injection prohibition determination routine performed in the control system.

FIG. 5 illustrates a flowchart of a P/L injection prohibition determination routine performed to determine a necessity of prohibition of P/L injection, in the P/L injection prohibition control. The process of this routine is performed repeatedly by the electronic control unit 40 every prescribed control cycle during the operation of the engine 10.

When the process of this routine is started, it is first determined whether or not the abnormality flag is cleared in step S200. That is, it is determined whether or not the fuel pressure sensor 38 is determined to have an abnormality. Here, when the abnormality flag is set, that is, when a diagnosis result that the fuel pressure sensor 38 has an abnormality has been already confirmed (NO), the process proceeds to step S210. In step S210, the partial lift injection is prohibited. That is, at a time when the failsafe process is performed, the prohibition of the partial lift injection is also performed in addition to the stop of the pressurizing operation of the high-pressure fuel pump 24 and the change of computing mode of the current application time of the cylinder injection valve 37.

Meanwhile, when the abnormality flag is cleared (S200: YES), the process proceeds to step S201. In step S201, it is determined whether or not the fuel pressure detection value Pm of the fuel pressure sensor 38 is kept fixed for the prescribed time T2 or more. Here, when an affirmative determination is made, that is, when it is determined that the second abnormality determination condition is established (YES), the process proceeds to step S210, in which the partial lift injection is prohibited. Meanwhile, when a negative determination is made (NO), the process proceeds to step S211, in which the partial lift injection is permitted.

Figure 6:
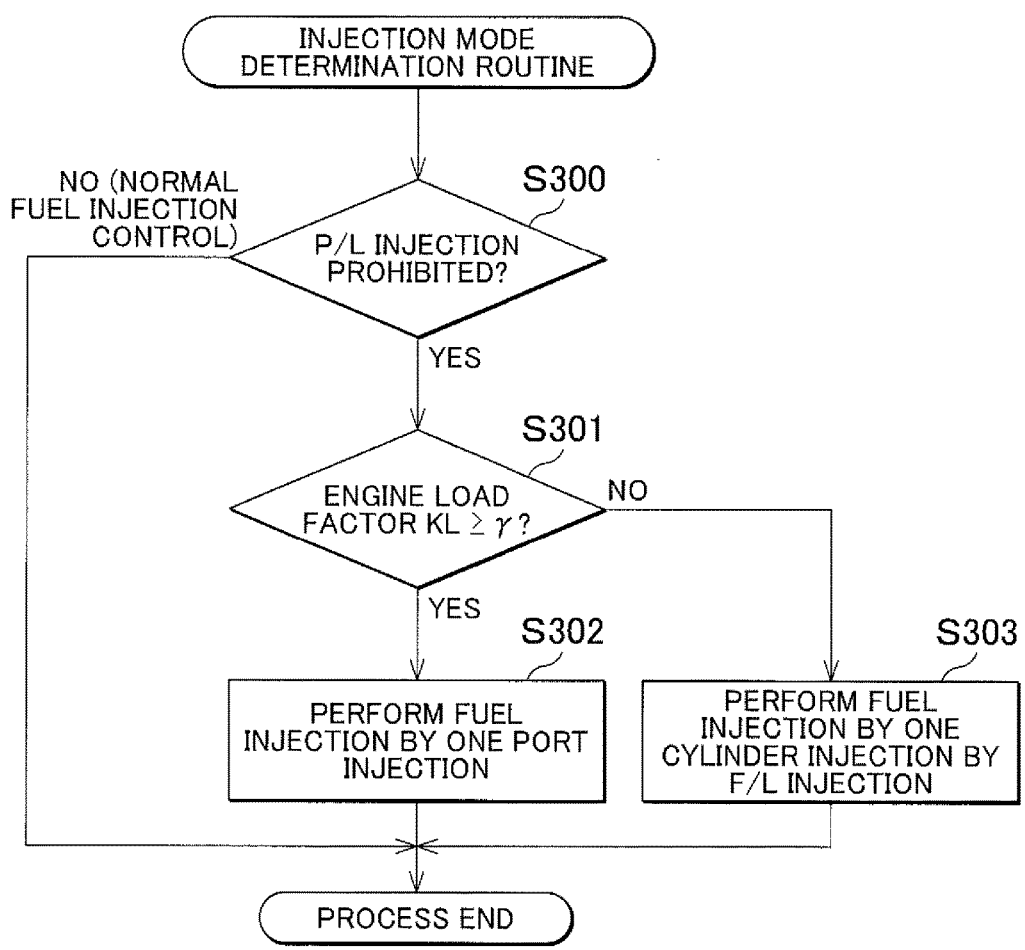
FIG. 6 is a flowchart of an injection mode determination routine performed in the control system.

FIG. 6 illustrates a flowchart of an injection mode determination routine to determine a fuel injection mode by the cylinder injection valve 37 and the port injection valve 25 based on a determination result in the P/L injection prohibition determination routine. The process of this routine is performed repeatedly by the electronic control unit 40 every prescribed control cycle during the operation of the engine 10.

When the process of this routine is started, it is first determined in step S300 whether or not the partial lift injection is prohibited in the P/L injection prohibition determination routine. When the partial lift injection is not prohibited, that is, when the partial lift injection is permitted (NO), the process of this routine is just finished. In this case, the fuel injection control is just performed, and a multistage injection including the partial lift injection of the cylinder injection valve 37 is performed as needed.

Meanwhile, when the partial lift injection is prohibited (YES), it is determined in step S301 whether the engine load factor KL is a prescribed value γ or more. An upper limit of a range of the engine load factor KL that can perform the fuel injection by the cylinder injection valve 37 even in a state where an injection pressure of the fuel injection by the cylinder injection valve 37 decreases to a feed pressure is set to the prescribed value γ.

Here, when the engine load factor KL is the prescribed value γ or more (YES), it is determined in step S302 that the fuel injection is performed by one port injection by the port injection valve 25, and after that, the process of this routine is finished. In the meantime, when the engine load factor KL is less than the prescribed value γ (NO), it is determined in step S303 that the fuel injection is performed by one cylinder injection by the full lift injection of the cylinder injection valve 37, and after that, the process of this routine is finished. That is, at the time of the prohibition of the partial lift injection, the multistage injection is prohibited, and the fuel injection is performed by one port injection or one cylinder injection.

Subsequently, the following describes an operation of the present embodiment configured as described above. In the present embodiment, the fuel pressure variable control to control the operation of the high-pressure fuel pump 24 is performed based on the fuel pressure detection value Pm of the fuel pressure sensor 38, such that the fuel pressure detection value Pm achieves the target fuel pressure Pt set according to an engine operation state. Accordingly, when an abnormality occurs in the fuel pressure sensor 38 and the fuel pressure detection value Pm becomes an inaccurate value, the fuel pressure variable control based on the value is not performed appropriately, so that the fuel pressure detection value Pm deviates from the target fuel pressure Pt.

In the present embodiment, when the deviation between the fuel pressure detection value Pm and the target fuel pressure Pt is kept at the prescribed value α or more for the prescribed abnormality determination time T1 or more, the first abnormality determination condition is established, so that the failsafe process is performed. In the failsafe process, a state where the current application to the electromagnetic solenoid 51 is stopped is maintained, and the pressurizing operation of the high-pressure fuel pump 24 is stopped. Further, the computing mode of the current application time of the cylinder injection valve 37 is changed so as to calculate the current application time by use of the feed pressure setting value Pf instead of the fuel pressure detection value Pm. Further, at a time when the failsafe process is performed, the fuel injection by the partial lift injection of the cylinder injection valve 37 is prohibited.

When the pressurizing operation of the high-pressure fuel pump 24 is stopped, a fuel pressure of a part of the high-pressure fuel pump 24 on an upstream side relative to the check valve 36 becomes a feed pressure setting value Pf. The fuel pressure in the high-pressure fuel pipe 26 is maintained to be a pressure higher than the feed pressure setting value Pf for a while after the stop of the pressurizing operation. However, at this time, the fuel supply to the high-pressure fuel pipe 26 is stopped. Accordingly, the fuel pressure in the high-pressure fuel pipe 26 gradually decreases according to fuel consumption by the fuel injection of the cylinder injection valve 37. When the fuel pressure in the high-pressure fuel pipe 26 becomes the feed pressure setting value Pf or less, the check valve 36 is opened, so that the fuel is introduced into the high-pressure fuel pipe 26. Hereby, the fuel pressure in the high-pressure fuel pipe 26 after the stop of the pressurizing operation of the high-pressure fuel pump 24 is finally maintained at the feed pressure setting value Pf. On that account, even when an abnormality occurs in the fuel pressure sensor 38, the fuel pressure in the high-pressure fuel pipe 26 can be grasped.

In the meantime, at this time, the computing mode of the current application time of the cylinder injection valve 37 is changed so as to calculate the current application time by use of the feed pressure setting value Pf instead of the fuel pressure detection value Pm. That is, in a state where a pressure of the fuel supplied to the cylinder injection valve 37 is the feed pressure setting value Pf, a current application time that allows a fuel corresponding to the cylinder injection amount Qd to be injected is calculated. On that account, even when an abnormality occurs in the fuel pressure sensor 38, the fuel injection corresponding to the cylinder injection amount Qd can be performed by the cylinder injection valve 37.

Note that, in the present embodiment, in order to secure the diagnosis accuracy, it takes time to some extent to make an abnormality diagnosis of the fuel pressure sensor 38. Further, it also takes time after an abnormality occurs in the fuel pressure sensor 38 until the deviation between the fuel pressure detection value Pm and the target fuel pressure Pt is increased to the prescribed value α or more. Accordingly, even if an abnormality occurs in the fuel pressure sensor 38, the failsafe process is not started promptly. If the partial lift injection in which the fuel pressure largely affects the injection amount accuracy is performed during that period, the combustion deteriorates before the start of the failsafe process, which may cause a misfire or an engine stall. Particularly, in the fuel injection during the compression stroke by the partial lift injection of the cylinder injection valve 37 in the catalyst warm-up promotion control, if the injection amount deviates from a requested amount, a fuel spray travel distance changes. This makes it difficult to carry the injected fuel by the airflow in the cylinder, and eventually, it is difficult to collect the injected fuel around the ignition plug. Accordingly, if a current application time of the partial lift injection of the cylinder injection valve 37 is set based on the fuel pressure detection value Pm of the fuel pressure sensor 38 in which an abnormality occurs, the combustion particularly easily deteriorates.

In the meantime, as described above, one of the abnormality of the fuel pressure sensor 38 is a stack abnormality, and when the stack abnormality occurs, the fuel pressure detection value Pm of the fuel pressure sensor 38 is kept at a fixed value and does not change. In the present embodiment, even in a case where the first abnormality determination condition is not established, if the fuel pressure detection value Pm of the fuel pressure sensor 38 is kept fixed for the prescribed time T2 or more, the partial lift injection is prohibited, and the fuel injection is performed without the partial lift injection of the cylinder injection valve 37. Such prohibition of the partial lift injection is performed earlier than the start of the failsafe process that is performed after it is determined in the abnormality diagnosis that an abnormality occurs. On this account, in the present embodiment, it is possible to restrain an occurrence of a misfire or an engine stall due to the deterioration in combustion, before the start of the failsafe process.

In the meantime, the abnormality of the fuel pressure sensor 38, determined as an abnormality in the abnormality diagnosis, includes, for example, abnormalities such as a decrease in a response speed of the fuel pressure sensor 38 as well as the stack abnormality. However, in those abnormalities, the fuel pressure detection value Pm changes, following the fuel pressure in the high-pressure fuel pipe 26 to some extent. On that account, in a case of the abnormalities except the stack abnormality, the combustion rarely deteriorates to such a degree that a misfire or an engine stall occurs, during the time necessary for the abnormality diagnosis.

Note that, at a time when an abnormality occurs in the fuel pressure sensor 38, it is difficult to control the fuel pressure in the high-pressure fuel pipe 26 appropriately, and further, it is difficult to check the fuel pressure. On this account, at a time when an abnormality occurs in the fuel pressure sensor 38, the fuel pressure in the high-pressure fuel pipe 26 may also largely decrease with respect to a requested fuel pressure. When the fuel pressure in the high-pressure fuel pipe 26 decreases, the injection pressure of the fuel injection by the cylinder injection valve 37 also decreases. In a case of a high load operation in which an internal pressure of the cylinder at the time of injection becomes high, the injection pressure becomes insufficient, which may make it difficult to perform the fuel injection by the cylinder injection valve 37. In that respect, in the present embodiment, the fuel injection at a time when the partial lift injection is prohibited is performed such that: the full lift injection by the cylinder injection valve 37 is performed when the engine load factor KL is less than the prescribed value γ; and the fuel injection by the port injection valve 25 is performed when the engine load factor KL is the prescribed value γ or more. Accordingly, in the present embodiment, even if the fuel pressure in the high-pressure fuel pipe 26 becomes low due to the abnormality of the fuel pressure sensor 38, it is possible to avoid such a situation that fuel injection becomes impossible due to an insufficient injection pressure.

In the meantime, when the fuel pressure detection value Pm deviates from an actual value due to the abnormality of the fuel pressure sensor 38, an injection amount per current application time of the cylinder injection valve 37 changes, which causes a deviation in the fuel injection amount. Further, as described above, at a time when the valve body 55 of the cylinder injection valve 37 is opened, the fuel pressure in the combustion chamber 59 serves as a resistance. On this account, when the fuel pressure changes, the lift-starting current application time T0 and the P/L maximum current application time Tpmax also change. Such changes also become a factor of the deviation in the fuel injection amount at a time when an abnormality occurs in the fuel pressure sensor 38. In the meantime, in the multistage injection in which the fuel corresponding to the requested injection amount Qt is divided to be injected several times, the valve body 55 is also opened several times. Accordingly, the changes in the lift-starting current application time T0 and the P/L maximum current application time Tpmax, caused due to the deviation in the fuel pressure detection value Pm, more largely affect the injection amount accuracy of the cylinder injection valve 37 in a case of the multistage injection as compared to a case where the fuel corresponding to the requested injection amount Qt is injected by one fuel injection. Meanwhile, in the control system of the present embodiment, the multistage injection is prohibited in a state where an abnormality of the fuel pressure sensor 38 is suspected. This accordingly makes it possible to further restrain the deterioration in combustion at a time when an abnormality actually occurs in the fuel pressure sensor 38.

In the meantime, during the failsafe process, the fuel injection control of the cylinder injection valve 37 is performed on the premise that the fuel pressure in the high-pressure fuel pipe 26 is the feed pressure setting value Pf. However, during the failsafe process, even if the fuel pressure in the high-pressure fuel pipe 26 deviates from the feed pressure setting value Pf, it is difficult to check the deviation directly. Accordingly, it is risky to perform, during the failsafe process, the partial lift injection in which the fuel pressure largely affects the injection amount accuracy and the combustion. Further, during the failsafe process, an injection pressure of the fuel injection by the cylinder injection valve 37 is low. On this account, an expected aim of the partial lift injection, such as an increase in a fuel concentration around the ignition plug at the time of the catalyst warm-up promotion control, cannot be achieved. In view of this, in the present embodiment, the partial lift injection is prohibited during the failsafe process.

Further, during the failsafe process, the injection pressure of the fuel injection by the cylinder injection valve 37 is low. On this account, at the time of a high load operation in which the internal pressure in the cylinder is high, the fuel may not be able to be injected appropriately from the cylinder injection valve 37 due to an insufficient injection pressure. In view of this, in the present embodiment, similarly to the prohibition of the partial lift injection during the abnormality diagnosis, the fuel injection during the failsafe process in which the partial lift injection is prohibited is performed such that: the full lift injection by the cylinder injection valve 37 is performed when the engine load factor KL is less than the prescribed value γ; and the fuel injection by the port injection valve 25 is performed when the engine load factor KL is the prescribed value γ or more.

Incidentally, in a case where an engine stall occurs before a diagnosis result is confirmed, the diagnosis is finished halfway. This results in that notification to a driver by lighting of an indicator and recording of a history in the nonvolatile memory are not performed. In such a case, the driver notices the abnormality later or specification of an abnormal place at the time of repair becomes difficult. In that respect, in the present embodiment, it is possible to restrain the occurrence of an engine stall caused due to the deterioration in combustion during the diagnosis, thereby making it possible to more surely perform the notification and the recording of the history at a time when an abnormality occurs.

Note that, in the present embodiment, the high-pressure fuel pump 24 has a configuration corresponding to a "fuel pump" that supplies fuel to a fuel injection valve, and the cylinder injection valve 37 has a configuration corresponding to a "fuel injection valve" to which such a fuel pump supplies the fuel. Further, in the present embodiment, the electronic control unit 40 has a configuration corresponding to a "fuel-pressure controlling portion," an "injection controlling portion", a "diagnosis portion," and an "air/fuel-ratio controlling portion."

According to the control system of the present embodiment described above, it is possible to yield the following effects. In the present embodiment, even in a case where the first abnormality determination condition, which is established when an abnormality occurs in the fuel pressure sensor 38, is not established, when the second abnormality determination condition, which is established when an abnormality possibly occurs in the fuel pressure sensor 38, is established, the injection control is performed on the cylinder injection valve 37 and the port injection valve 25 so as to perform the fuel injection without performing the partial lift injection. Further, the second abnormality determination condition is set as a condition that is established prior to the first abnormality determination condition at a time when an abnormality occurs in the fuel pressure sensor 38. This makes it possible to secure diagnosis accuracy of the abnormality of the fuel pressure sensor 38 and to restrain deterioration in combustion of the engine 10 during the diagnosis.

This makes it possible to restrain the diagnosis from being finished halfway due to an occurrence of an engine stall. Accordingly, when an abnormality occurs, it is possible to more surely perform notification of the occurrence of the abnormality and recording of a history of the occurrence of the abnormality.

In the present embodiment, the abnormality diagnosis is performed on the fuel pressure sensor 38 such that the first abnormality determination condition is set so as to be established when the deviation between the fuel pressure detection value Pm of the fuel pressure sensor 38 and the target fuel pressure Pt is kept at the prescribed value α or more for the prescribed abnormality determination time T1 or more. In order to perform the abnormality diagnosis with accuracy, it is necessary to set a long time to some extent as the abnormality determination time T1. Meanwhile, in the present embodiment, it is possible to restrain the deterioration in combustion at a time when the partial lift injection is performed during a period after the abnormality occurs but before the diagnosis is confirmed. This accordingly makes it possible to set a longer time as the abnormality determination time T1 and to improve the diagnosis accuracy.

In the present embodiment, the second abnormality determination condition is set so as to be established when a state where the fuel pressure detection value Pm is kept fixed continues for the prescribed time T2 or more. On that account, in a case where a stack abnormality occurs in the fuel pressure sensor 38, it is possible to restrain the combustion from deteriorating during a period before a diagnosis result is confirmed.

In the present embodiment, the catalyst warm-up promotion control to perform the multistage injection is performed during the idling operation of the engine 10 in warming up of the catalyst device 19. The multistage injection includes a fuel injection during the intake stroke by the full lift injection and a fuel injection during the compression stroke by the partial lift injection. In such a catalyst warm-up promotion control, combustibility at the cold start in which the combustion is hard to stabilize is secured by the partial lift injection during the compression stroke. Accordingly, when a deviation occurs in the injection amount of the partial lift injection in the catalyst warm-up promotion control, a serious deterioration in combustion occurs, which easily causes a misfire or an engine stall. In this regard, in the present embodiment, the partial lift injection is prohibited at a time point when the second abnormality determination condition is established and an abnormality of the fuel pressure sensor 38 is suspected. Accordingly, even if an abnormality occurs in the fuel pressure sensor 38 during the catalyst warm-up promotion control, this hardly causes a misfire or an engine stall.

In the present embodiment, the fuel injection at a time when the partial lift injection is prohibited is performed such that the cylinder injection of the cylinder injection valve 37 by the full lift injection is performed when the engine load factor KL is less than the prescribed value γ; and the port injection of the port injection valve 25 is performed when the engine load factor KL is the prescribed value γ or more. On this account, even if the fuel pressure in the high-pressure fuel pipe 26 decreases due to the abnormality of the fuel pressure sensor 38, it is possible to avoid such a situation that fuel injection becomes impossible due to an insufficient injection pressure.

In the present embodiment, when the second abnormality determination condition is established, the multistage injection in which the fuel corresponding to the requested injection amount Qt is divided to be injected several times is prohibited. This accordingly makes it possible to more appropriately restrain the deterioration in combustion at a time when an abnormality actually occurs in the fuel pressure sensor 38.

Next will be described details of a second embodiment of the control system with reference to FIG. 7. In the present embodiment and the after-mentioned third embodiment, configurations common to those in the first embodiment are denoted by the same reference signs, and detail explanations thereof are omitted. The control system of the present embodiment is obtained by modifying a content of the second abnormality determination condition, which is a condition of the partial lift injection prohibition in the P/L injection prohibition determination routine in the control system of the first embodiment. The other parts except a process content of the routine are the same as the first embodiment.

The present embodiment is premised on execution of an air/fuel-ratio feedback control. The air/fuel-ratio feedback control is a control to make an air/fuel ratio of a fuel/air mixture burnt in the engine 10 achieve a target air/fuel ratio. The electronic control unit 40 calculates a requested injection amount based on a current cylinder mass airflow found from the engine rotation number NE and the engine load factor KL, so that the air/fuel ratio of the fuel/air mixture burnt in the engine 10 reaches the target air/fuel ratio approximately. However, only such an open control of the requested injection amount causes a slight deviation between an actual air/fuel ratio and the target air/fuel ratio due to individual differences in an intake characteristic, a spray characteristic, and the like of the engine 10. In view of this, in an air/fuel-ratio feedback control, the air/fuel ratio is controlled to the target air/fuel ratio by performing feedback correction on the requested injection amount according to a deviation between an air/fuel-ratio detection value of the air/fuel-ratio sensor 18 and the target air/fuel ratio.

Such an air/fuel-ratio feedback control is performed by the electronic control unit 40. That is, in the present embodiment, the electronic control unit 40 has a configuration corresponding to an air/fuel-ratio controlling portion that corrects the requested injection amount based on the detection value of the air/fuel-ratio sensor 18 so that the detection value of the air/fuel-ratio sensor 18 achieves the target air/fuel ratio.

Figure 7:
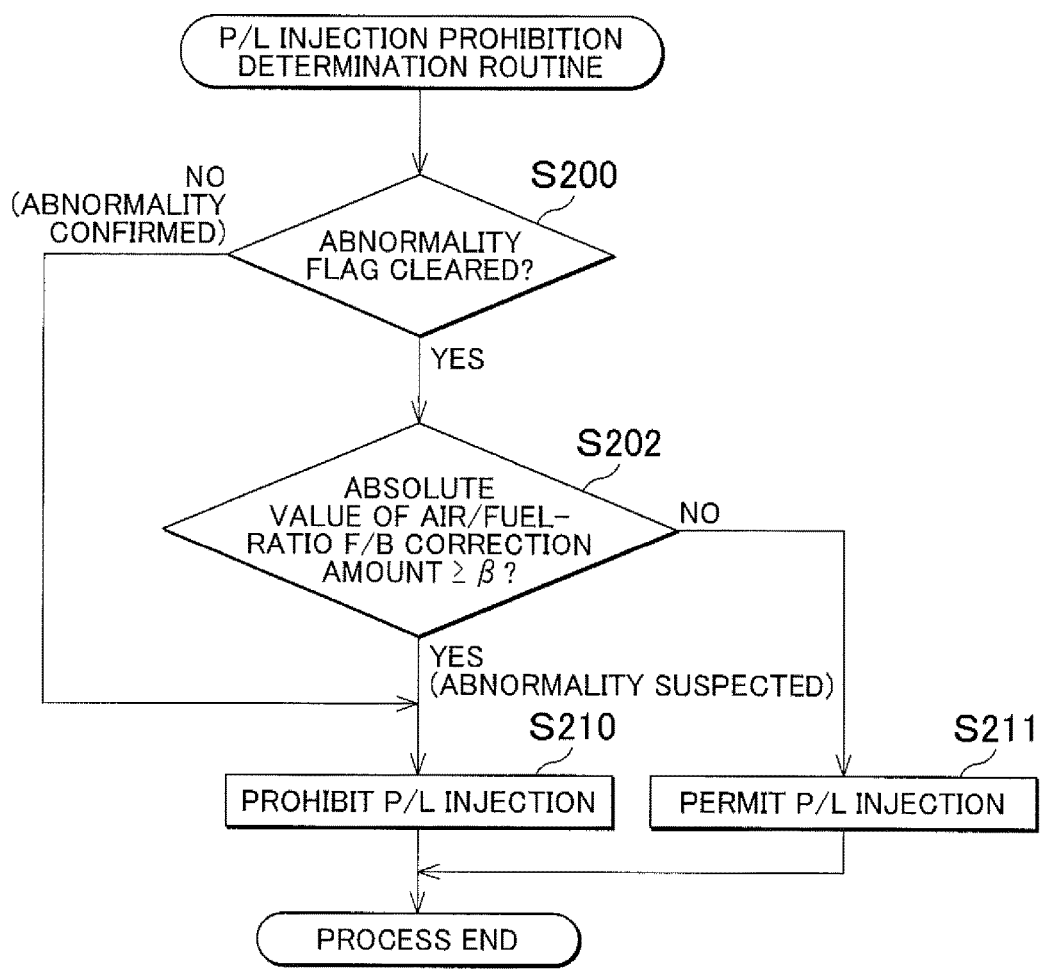
FIG. 7 is a flowchart of a P/L injection prohibition determination routine performed in a control system of a second embodiment.

FIG. 7 illustrates a flowchart of a P/L injection prohibition determination routine applied to the present embodiment. The process of this routine is performed repeatedly by the electronic control unit 40 every prescribed control cycle during the operation of the engine.

When the process of this routine is started, it is first determined whether the abnormality flag is cleared or not in step S200. When the abnormality flag is set (NO), the process proceeds to step S210. In step S210, the partial lift injection is prohibited, and after that, the process of this routine is finished.

Meanwhile, when the abnormality flag is cleared (S200: YES), the process proceeds to step S202. In step S202, it is determined whether or not an absolute value of an air/fuel-ratio feedback (FIB) correction amount is a prescribed determination value β or more. The air/fuel-ratio feedback correction amount is a correction amount of the requested injection amount obtained according to the deviation between the air/fuel-ratio detection value of the air/fuel-ratio sensor 18 and the target air/fuel ratio, in the air/fuel-ratio feedback control.

Here, when the absolute value of the air/fuel-ratio feedback correction amount is the determination value β or more (YES), the process proceeds to step S210, in which the partial lift injection is prohibited. After that, the process of this routine is finished. Meanwhile, when the absolute value of the air/fuel-ratio feedback correction amount is less than the determination value β (NO), the process proceeds to step S211, in which the partial lift injection is permitted. The process of this routine is finished herein.

Next will be described an operation of the control system of the present embodiment. As described above, when an abnormality occurs in the fuel pressure sensor 38, the electronic control unit 40 cannot grasp the fuel pressure in the high-pressure fuel pipe 26, and eventually an injection pressure of fuel injection by the cylinder injection valve 37, thereby resulting in that an injection amount instructed to the cylinder injection valve 37 deviates from an actual injection amount by the cylinder injection valve 37. In the meantime, as described above, even before the correction by the air/fuel ratio feedback control, the requested injection amount is set to a value at which the air/fuel ratio approximately achieves the target air/fuel ratio. However, when an abnormality occurs in the fuel pressure sensor 38, the instructed injection amount deviates from the actual injection amount, so the absolute value of the air/fuel-ratio feedback correction amount becomes large. On this account, when the absolute value of the air/fuel-ratio feedback correction amount increases to exceed a range that the absolute value generally takes, it is suspected that an abnormality occurs in the fuel pressure sensor 38. In the present embodiment, in such a case, the partial lift injection is prohibited. Accordingly, even if an abnormality actually occurs in the fuel pressure sensor 38, it is possible to restrain the deterioration in combustion during the diagnosis. According to the present embodiment, it is also possible to yield the above effects. Further, in the present embodiment, the second abnormality determination condition is set to be established when the absolute value of the air/fuel-ratio feedback correction amount is the prescribed value or more. The air/fuel-ratio feedback correction amount is a correction amount of the requested injection amount by the air/fuel-ratio controlling portion.

Next will be described details of the third embodiment of the control system with reference to FIG. 8. Similarly to the second embodiment, the control system of the present embodiment is also obtained by modifying a content of the second abnormality determination condition, which is a condition of the partial lift injection prohibition in the P/L injection prohibition determination routine in the control system of the first embodiment. The other parts except a process content of this routine are the same as the first embodiment.

Figure 8:
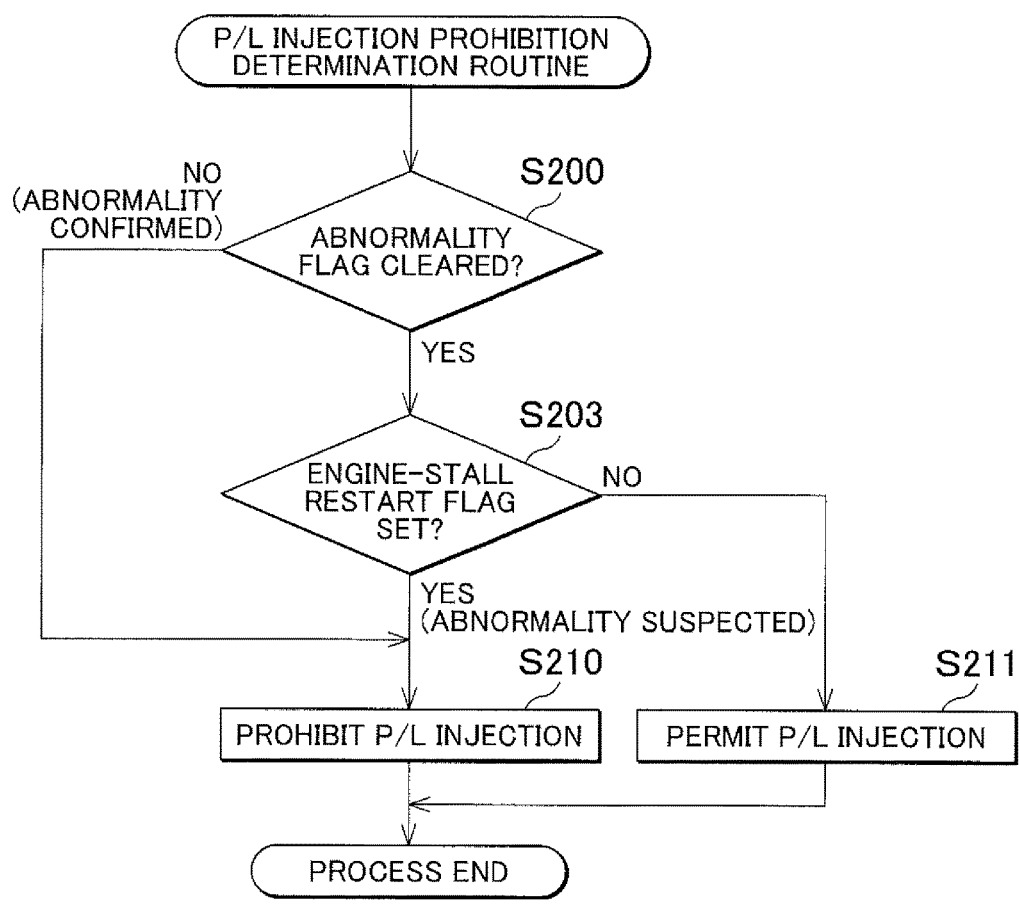
FIG. 8 is a flowchart of a P/L injection prohibition determination routine performed in a control system of a third embodiment.

FIG. 8 illustrates a flowchart of a P/L injection prohibition determination routine applied to the present embodiment. The process of this routine is performed repeatedly by the electronic control unit 40 every prescribed control cycle during the operation of the engine.

When the process of this routine is started, it is first determined whether or not the abnormality flag is cleared or not in step S200. When the abnormality flag is set (NO), the process proceeds to step S210. In step S210, the partial lift injection is prohibited, and after that, the process of this routine is finished.

Meanwhile, when the abnormality flag is cleared (S200: YES), the process proceeds to step S203. In step S203, it is determined whether or not an engine-stall restart flag is set. The engine-stall restart flag is a flag which is set when current engine starting is a restart after an engine stall and which is cleared when the engine 10 is stopped normally. Here, when the engine-stall restart flag is set (YES), the process proceeds to step S210, in which the partial lift injection is prohibited. After that, the process of this routine is finished. Meanwhile, when the engine-stall restart flag is cleared (NO), the process proceeds to step S211, in which the partial lift injection is permitted. After that, the process of this routine is finished.

Next will be described operations/effects of the control system of the present embodiment. As mentioned earlier, when an abnormality occurs in the fuel pressure sensor 38, an injection amount of the cylinder injection valve 37 cannot be controlled appropriately, so that the combustion deteriorates. On this account, when an abnormality occurs in the fuel pressure sensor 38, an engine stall easily occurs. Accordingly, in a case where an engine stall occurs, there is a possibility that the fuel pressure sensor 38 has an abnormality. In the present embodiment, when the engine is restarted after the engine stall, the partial lift injection is prohibited. On that account, when an abnormality occurs in the fuel pressure sensor 38, it is possible to restrain the combustion from deteriorating during the diagnosis, thereby making it possible to restrain a recurrence of the engine stall until the diagnosis is confirmed and the failsafe process is started. According to the present embodiment, it is also possible to yield the above effects. Note that, in the present embodiment, the second abnormality determination condition is set to be established when an engine stall occurs.

Incidentally, when the combustion largely deteriorates due to the abnormality of the fuel pressure sensor 38, an engine stall may occur immediately after starting of the engine 10. In such a case, it is difficult to perform an abnormality diagnosis of the fuel pressure sensor 38 till the last during the operation of the engine 10, which may repeat an engine stall with the abnormality diagnosis not being confirmed. In this regard, in the present embodiment, when an engine stall occurs, the partial lift injection is prohibited, thereby restraining the deterioration in combustion of the engine 10 before a result of the abnormality diagnosis is confirmed at the time of an occurrence of an abnormality in the fuel pressure sensor 38. On that account, even when the combustion of the engine 10 deteriorates until an engine stall occurs due to the abnormality of the fuel pressure sensor 38, it is possible to easily diagnose the abnormality.

The foregoing embodiments may also be carried out by adding changes as stated below. In the first embodiment, the second abnormality determination condition is established when the detection value of the fuel pressure sensor is kept fixed for the prescribed time T2 or more, so that the partial lift injection is prohibited. The second abnormality determination condition should be established when the fuel pressure sensor 38 possibly has an abnormality. Accordingly, the prescribed time T2 is set to a relatively short time before a stack abnormality is confirmed. In a case where the detection value of the fuel pressure sensor is kept fixed over the prescribed time T2 and such a state further continues, the stack abnormality will be confirmative sometime soon. On this account, if a time longer than the prescribed time T2 is set as a stack abnormality determination time and the first abnormality determination condition is set so as to be established when the detection value of the fuel pressure sensor is kept fixed for the stack abnormality determination time, the electronic control unit 40 can make a diagnosis of a stack abnormality on the fuel pressure sensor 38. Further, the electronic control unit 40 may set the first abnormality determination condition so as to be established in either of a case where the deviation between the fuel pressure detection value Pm and the target fuel pressure Pt is kept at the prescribed value or more for the prescribed abnormality determination time T1 or more, and a case where the detection value of the fuel pressure sensor is kept fixed for the stack abnormality determination time.

In the above embodiments, fuel injection modes at the time of the prohibition of the partial lift injection are changed according to the engine load factor KL, but such changing may not be performed. For example, at the time of the prohibition of the partial lift injection, the fuel injection may be always performed only by the port injection, or the fuel injection may be performed without changing the separate injection rates of the cylinder injection and the port injection just by adding an amount corresponding to the partial lift injection to the full lift injection.

In the above embodiments, as the failsafe process performed when the first abnormality determination condition is established and it is determined that the fuel pressure sensor 38 has an abnormality, the stop of the pressurizing operation of the high-pressure fuel pump 24 and the change of computing mode of the current application time of the cylinder injection valve 37 are performed. Such a failsafe process may be performed in another manner.

In the above embodiments, when the second abnormality determination condition is established, all multistage injections are prohibited. As described above, in comparison with the partial lift injection, the influence of the abnormality of the fuel pressure sensor 38 with respect to the combustion of the engine 10 is small in the full lift injection. Accordingly, even in a state where a misfire or an engine stall occurs if the multistage injection including the partial lift injection is performed, the multistage injection only by the full lift injection may restrain the deterioration in combustion of the engine 10 within a range where a misfire or an engine stall does not occur. In such a case, when the second abnormality determination condition is established, not all the multistage injections, but only the multistage injection including the partial lift injection may be prohibited, and the multistage injection only by the full lift injection may be permitted.

In each of the above embodiments, the second abnormality determination condition is set to be established only in corresponding one of the following cases: (A) a case where the fuel pressure detection value Pm is kept fixed for the prescribed time T2 or more; (B) a case where the absolute value of the air/fuel-ratio feedback correction amount is the prescribed value γ or more; and (C) a case where an engine stall occurs. The second abnormality determination condition may be set to be established in any two cases selected from among the above cases (A) to (C), or the second abnormality determination condition may be set to be established in any of the above three cases (A) to (C). Further, if the second abnormality determination condition is set to be established when the fuel pressure sensor 38 possibly has an abnormality and to be established prior to the first abnormality determination condition when an abnormality occurs in the fuel pressure sensor 38, the second abnormality determination condition may be set to be established in a case other than the above cases (A) to (C), or may be set to be established in a case other than the above cases (A) to (C), in addition to the cases (A) to (C).

In the above embodiments, the first abnormality determination condition is set so as to be established when the deviation between the fuel pressure detection value Pm and the target fuel pressure Pt is kept at the prescribed value α or more for the prescribed abnormality determination time T1 or more. However, such a first abnormality determination condition may be other conditions provided that the conditions are established when an abnormality occurs in the fuel pressure sensor 38.

What is claimed is:

1. A control system comprising:
    an engine including:
        i) a fuel injection valve configured to inject a fuel by opening a valve body according to current application;
        ii) a fuel pump configured to supply the fuel to the fuel injection valve; and
        iii) a fuel pressure sensor configured to detect a fuel pressure, the fuel pressure being a pressure of the fuel supplied to the fuel injection valve from the fuel pump; and
    an electronic control unit configured to:
        i) set a current application time of the fuel injection valve based on a requested injection amount set according to an engine operation state and a detection value detected by the fuel pressure sensor;
        ii) perform an injection control on the fuel injection valve by a partial lift injection and a full lift injection, the partial lift injection being an injection control to stop the injection before the valve body is opened to a fully open position, the full lift injection being an injection control to stop the injection after the valve body is opened to the fully open position;
        iii) set a first abnormality determination condition and a second abnormality determination condition, the first abnormality determination condition being a condition to be established when an abnormality occurs in the fuel pressure sensor, the second abnormality determination condition being a condition to be established when the fuel pressure sensor possibly has an abnormality and to be established prior to the first abnormality determination condition when an abnormality occurs in the fuel pressure sensor;
        iv) determine a temporary abnormality of the fuel pressure sensor when the second abnormality determination condition is established, and determine an abnormality of the fuel pressure sensor when the first abnormality determination condition is established; and
        v) perform the injection control on the fuel injection valve so as to perform a fuel injection without the partial lift injection, when the temporary abnormality of the fuel pressure sensor is determined.

2. The control system according to claim 1, wherein:
    the fuel pump is a high-pressure fuel pump configured to pressurize a fuel pumped up by a feed pump from a fuel tank; and
    the electronic control unit is configured to:
        i) control an operation of the high-pressure fuel pump based on the detection value detected by the fuel pressure sensor, such that the detection value of the fuel pressure sensor achieves a target fuel pressure set according to the engine operation state;
        ii) stop a pressurizing operation of the high-pressure fuel pump when the electronic control unit determines the abnormality of the fuel pressure sensor; and
        iii) set the current application time of the fuel injection valve by use of a setting value of a feed pressure of the feed pump instead of the detection value of the fuel pressure sensor when the electronic control unit determines the abnormality of the fuel pressure sensor.

3. The control system according to claim 2, wherein the electronic control unit is configured such that the first abnormality determination condition is set so as to be established when a deviation between the detection value of the fuel pressure sensor and the target fuel pressure is kept at a prescribed value or more for a prescribed abnormality determination time or more.

4. The control system according to claim 1, wherein the electronic control unit is configured such that the second abnormality determination condition is set so as to be established when the detection value of the fuel pressure sensor is kept fixed for a prescribed time or more.

5. The control system according to claim 4, wherein the electronic control unit is configured such that a time longer than the prescribed time is set as a stack abnormality determination time, and the first abnormality determination condition is set so as to be established when the detection value of the fuel pressure sensor is kept fixed for the stack abnormality determination time.

6. The control system according to claim 1, wherein the electronic control unit is configured such that the second abnormality determination condition is set so as to be established when an engine stall occurs.

7. The control system according to claim 1, further comprising:
    an air/fuel-ratio sensor configured to detect an air/fuel ratio of a fuel/air mixture burnt in the engine, wherein:
    the electronic control unit is configured to correct the requested injection amount based on the detection value of the air/fuel-ratio sensor such that the detection value of the air/fuel-ratio sensor achieves a target air/fuel ratio; and
    the electronic control unit is configured such that the second abnormality determination condition is set so as to be established when an absolute value of a correction amount of the requested injection amount is a prescribed value or more.

8. The control system according to claim 1, wherein the electronic control unit is configured to prohibit a multistage injection when the second abnormality determination condition is established, the multistage injection being an injection in which a fuel corresponding to the requested injection amount is divided to be injected several times.

9. The control system according to claim 1, wherein the electronic control unit is configured to perform a multistage injection control including a fuel injection during an intake stroke by the full lift injection and a fuel injection during a compression stroke by the partial lift injection, during warming up of a catalyst device and during an idling operation of the engine, the catalyst device being configured to purify exhaust gas.

10. The control system according to claim 1, wherein:
    the fuel pump is a high-pressure fuel pump configured to pressurize the fuel pumped up by the feed pump from the fuel tank;

the fuel injection valve is a cylinder injection valve configured to inject the fuel supplied from the high-pressure fuel pump into a cylinder;

the engine includes a port injection valve configured to inject, into an intake port, the fuel supplied from the feed pump without passing through the high-pressure fuel pump;

the electronic control unit is configured to calculate an engine load factor;

the electronic control unit is configured such that, in a case where the partial lift injection is prohibited, when the engine load factor is a prescribed value or more, the electronic control unit performs a fuel injection control by the port injection valve, but when the engine load factor is less than the prescribed value, the electronic control unit performs a fuel injection control by the full lift injection of the cylinder injection valve.

* * * * *